United States Patent
Mihara et al.

(10) Patent No.: US 8,949,741 B2
(45) Date of Patent: Feb. 3, 2015

(54) APPARATUS AND METHOD FOR PRESENTING CONTENT

(75) Inventors: Isao Mihara, Tokyo (JP); Yasunobu Yamauchi, Kanagawa-ken (JP); Masahiro Sekine, Tokyo (JP); Yasukazu Higuchi, Kanagawa-ken (JP); Norihiro Nakamura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1006 days.

(21) Appl. No.: 12/659,276

(22) Filed: Mar. 2, 2010

(65) Prior Publication Data
US 2010/0229126 A1 Sep. 9, 2010

(30) Foreign Application Priority Data
Mar. 3, 2009 (JP) ................ P2009-049522

(51) Int. Cl.
*G06F 3/00* (2006.01)
*G06F 17/30* (2006.01)
*H04N 21/431* (2011.01)
*H04N 21/4335* (2011.01)
*H04N 21/84* (2011.01)

(52) U.S. Cl.
CPC .... *G06F 17/30796* (2013.01); *G06F 17/30061* (2013.01); *G06F 17/30817* (2013.01); *G06F 17/30849* (2013.01); *H04N 21/4312* (2013.01); *H04N 21/4335* (2013.01); *H04N 21/84* (2013.01)
USPC .......................................... 715/853

(58) Field of Classification Search
USPC .................. 715/721, 811, 772, 853, 854, 855
See application file for complete search history.

(56) References Cited

U.S. PATENT DOCUMENTS

| 6,263,501 | B1 | 7/2001 | Schein et al. |
| 6,389,424 | B1 | 5/2002 | Kim et al. |
| 6,466,193 | B1 | 10/2002 | Anai |
| 6,597,380 | B1 | 7/2003 | Wang et al. |
| 6,628,313 | B1 | 9/2003 | Minakuchi et al. |
| 6,646,980 | B1 | 11/2003 | Yamamoto et al. |
| 6,661,426 | B1 | 12/2003 | Jetha et al. |
| 6,665,668 | B1 | 12/2003 | Sugaya et al. |
| 6,674,484 | B1 | 1/2004 | Boland et al. |

(Continued)

FOREIGN PATENT DOCUMENTS

| EP | 1 051 034 | 11/2000 |
| EP | 1 513 341 | 9/2005 |

(Continued)

OTHER PUBLICATIONS

Yamauchi et al., U.S. Appl. No. 12/049,455, filed Mar. 17, 2008.

(Continued)

*Primary Examiner* — Thanh Vu
(74) *Attorney, Agent, or Firm* — Nixon & Vanderhye, P.C.

(57) ABSTRACT

A first content is selected by a user as a processing object. A change of at least a part of the first content is detected based on a time information from a timer. After the change is detected, a second content as a next processing object, a third content related to the first content, and a fourth content related to the second content, are acquired from a content information database. The second content, the third content and the fourth content, are symbolically laid out in a virtual space. The virtual space is visually presented to the user via a display.

17 Claims, 12 Drawing Sheets

(56) References Cited

U.S. PATENT DOCUMENTS

| | | |
|---|---|---|
| 6,675,174 B1 | 1/2004 | Bolle et al. |
| 6,734,877 B1 | 5/2004 | Honda et al. |
| 6,745,205 B2 | 6/2004 | Choi et al. |
| 6,756,972 B2 | 6/2004 | Komatsu et al. |
| 6,816,551 B1 | 11/2004 | Kasutani |
| 6,853,374 B2 | 2/2005 | Iwasaki |
| 6,853,389 B1 | 2/2005 | Ikeda |
| 6,956,812 B2 | 10/2005 | Okada et al. |
| 7,171,344 B2 | 1/2007 | Lind |
| 7,213,206 B2 | 5/2007 | Fogg |
| 7,245,677 B1 | 7/2007 | Pare, Jr. |
| 7,281,054 B2 | 10/2007 | Ishioka et al. |
| 7,298,384 B2 | 11/2007 | Anabuki et al. |
| 7,333,096 B2 | 2/2008 | Washio et al. |
| 7,369,142 B2 | 5/2008 | Kondo et al. |
| 7,421,455 B2 | 9/2008 | Hua et al. |
| 7,511,710 B2 | 3/2009 | Barrett |
| 7,519,121 B2 | 4/2009 | Matsushita et al. |
| 7,519,685 B2 | 4/2009 | Nonaka et al. |
| 7,557,774 B2 | 7/2009 | Baudisch et al. |
| 7,557,865 B2 | 7/2009 | Minami et al. |
| 7,590,948 B2 | 9/2009 | Narita et al. |
| 7,607,150 B1 | 10/2009 | Kobayashi et al. |
| 7,805,022 B2 | 9/2010 | Tanaka |
| 7,840,892 B2 | 11/2010 | Pyhalammi et al. |
| 7,930,634 B2 | 4/2011 | Nakamura |
| 7,940,285 B2 | 5/2011 | Would et al. |
| 8,002,633 B2 | 8/2011 | Shimizu |
| 8,041,155 B2 | 10/2011 | Mihara et al. |
| 8,174,523 B2 | 5/2012 | Higuchi et al. |
| 8,244,738 B2 | 8/2012 | Higuchi et al. |
| 2001/0007980 A1 | 7/2001 | Ishibashi et al. |
| 2001/0031129 A1 | 10/2001 | Tajima |
| 2001/0035855 A1 | 11/2001 | Komatsu et al. |
| 2002/0055924 A1 | 5/2002 | Liming |
| 2002/0057294 A1 | 5/2002 | Ejima et al. |
| 2002/0145603 A1 | 10/2002 | Iwasaki |
| 2003/0046694 A1 | 3/2003 | Istvan et al. |
| 2003/0103675 A1 | 6/2003 | Endo et al. |
| 2003/0122773 A1 | 7/2003 | Washio et al. |
| 2003/0142115 A1 | 7/2003 | Endo et al. |
| 2004/0172410 A1 | 9/2004 | Shimojima et al. |
| 2005/0010599 A1 | 1/2005 | Kake et al. |
| 2005/0055639 A1 | 3/2005 | Fogg |
| 2005/0076361 A1 | 4/2005 | Choi et al. |
| 2005/0097606 A1 | 5/2005 | Scott et al. |
| 2005/0138564 A1 | 6/2005 | Fogg |
| 2005/0193408 A1 | 9/2005 | Sull et al. |
| 2005/0210410 A1 | 9/2005 | Ohwa et al. |
| 2005/0212726 A1 | 9/2005 | Namba et al. |
| 2006/0064716 A1 | 3/2006 | Sull et al. |
| 2006/0086022 A1 | 4/2006 | Would et al. |
| 2006/0150215 A1 | 7/2006 | Wroblewski |
| 2007/0027855 A1 | 2/2007 | Kagawa |
| 2007/0106661 A1* | 5/2007 | Narita et al. ............... 707/5 |
| 2007/0106949 A1 | 5/2007 | Narita et al. |
| 2007/0107015 A1 | 5/2007 | Kazama et al. |
| 2007/0112940 A1 | 5/2007 | Morisawa et al. |
| 2007/0130318 A1 | 6/2007 | Roast |
| 2007/0136755 A1 | 6/2007 | Sakai |
| 2007/0252822 A1 | 11/2007 | Kim et al. |
| 2008/0074985 A1 | 3/2008 | Mukaiyama et al. |
| 2008/0136837 A1 | 6/2008 | Iguchi |
| 2008/0215548 A1 | 9/2008 | Ohashi et al. |
| 2008/0235729 A1 | 9/2008 | Doi et al. |
| 2008/0267582 A1 | 10/2008 | Yamauchi et al. |
| 2008/0316229 A1 | 12/2008 | Terayoko |
| 2008/0316518 A1 | 12/2008 | Watari et al. |
| 2009/0019031 A1 | 1/2009 | Krovitz et al. |
| 2009/0022480 A1 | 1/2009 | Yabe |
| 2009/0025030 A1 | 1/2009 | Kasutani |
| 2009/0080698 A1 | 3/2009 | Mihara et al. |
| 2009/0083814 A1 | 3/2009 | Sekine et al. |
| 2009/0138914 A1 | 5/2009 | Fukuda et al. |
| 2009/0228800 A1 | 9/2009 | Yasuda |
| 2009/0262139 A1 | 10/2009 | Tanaka et al. |
| 2010/0050098 A1* | 2/2010 | Turner ........................ 715/763 |
| 2010/0054703 A1 | 3/2010 | Tanaka et al. |
| 2010/0057696 A1 | 3/2010 | Miyazawa et al. |
| 2010/0057722 A1 | 3/2010 | Nakamura et al. |
| 2010/0058173 A1 | 3/2010 | Kizuka et al. |
| 2010/0058213 A1 | 3/2010 | Higuchi et al. |
| 2010/0058388 A1 | 3/2010 | Baba et al. |
| 2010/0156893 A1 | 6/2010 | Mihara et al. |
| 2010/0229126 A1 | 9/2010 | Mihara et al. |
| 2010/0302595 A1 | 12/2010 | Yamada et al. |
| 2010/0333140 A1 | 12/2010 | Onodera et al. |
| 2011/0083552 A1 | 4/2011 | Vicars |
| 2011/0252447 A1 | 10/2011 | Suzuki et al. |
| 2012/0266192 A1* | 10/2012 | Crew et al. ................... 725/40 |

FOREIGN PATENT DOCUMENTS

| | | |
|---|---|---|
| EP | 1 785 814 | 5/2007 |
| EP | 2 159 713 | 3/2010 |
| EP | 2 159 722 | 3/2010 |
| EP | 2 160 032 | 3/2010 |
| EP | 2 166 752 | 3/2010 |
| JP | 09-219835 | 8/1997 |
| JP | 09-259130 | 10/1997 |
| JP | 11-003346 | 1/1999 |
| JP | 11-175534 | 7/1999 |
| JP | 11-249774 | 9/1999 |
| JP | 2000-076267 | 3/2000 |
| JP | 2000-242648 | 9/2000 |
| JP | 2000-305946 | 11/2000 |
| JP | 2001-175380 | 6/2001 |
| JP | 2001-186497 | 7/2001 |
| JP | 2001-275048 | 10/2001 |
| JP | 2001-285787 | 10/2001 |
| JP | 2001-292383 | 10/2001 |
| JP | 2001-326881 | 11/2001 |
| JP | 2001-359006 | 12/2001 |
| JP | 2002-044543 | 2/2002 |
| JP | 2002-175269 | 6/2002 |
| JP | 2002-175321 | 6/2002 |
| JP | 2002-209178 | 7/2002 |
| JP | 2002-325214 | 11/2002 |
| JP | 2003-085884 | 3/2003 |
| JP | 2003-167914 | 6/2003 |
| JP | 2003-203035 | 7/2003 |
| JP | 2003-330969 | 11/2003 |
| JP | 2004-178085 | 6/2004 |
| JP | 2004-178384 | 6/2004 |
| JP | 2004-258390 | 9/2004 |
| JP | 2005-010854 | 1/2005 |
| JP | 2005-072826 | 3/2005 |
| JP | 2005-080247 | 3/2005 |
| JP | 2005-267390 | 9/2005 |
| JP | 2005-303741 | 10/2005 |
| JP | 2006-094520 | 4/2006 |
| JP | 2006-514451 | 4/2006 |
| JP | 2006-129122 | 5/2006 |
| JP | 2006-260178 | 9/2006 |
| JP | 2006-311163 | 11/2006 |
| JP | 2006-352378 | 12/2006 |
| JP | 2007-034663 | 2/2007 |
| JP | 2007-049502 | 2/2007 |
| JP | 2007-066285 | 3/2007 |
| JP | 2007-122496 | 5/2007 |
| JP | 2007-148669 | 6/2007 |
| JP | 2007-149313 | 6/2007 |
| JP | 2007-249641 | 9/2007 |
| JP | 2007-272651 | 10/2007 |
| JP | 2007-281945 | 10/2007 |
| JP | 2007-311892 | 11/2007 |
| JP | 2008-004985 | 1/2008 |
| JP | 2008-077774 | 4/2008 |
| JP | 2008-078785 | 4/2008 |
| JP | 2008-129942 | 6/2008 |
| JP | 2008-130032 | 6/2008 |
| JP | 2008-134725 | 6/2008 |
| JP | 2008-204193 | 9/2008 |
| JP | 2008-242504 | 10/2008 |

(56) References Cited

FOREIGN PATENT DOCUMENTS

| JP | 2008-270872 | 11/2008 |
|----|-------------|---------|
| JP | 2008-312178 | 12/2008 |
| JP | 2009-080580 | 4/2009 |
| WO | 00/33572 | 6/2000 |
| WO | 2004/061711 | 7/2004 |
| WO | 2004/091216 | 10/2004 |

OTHER PUBLICATIONS

Mihara et al., U.S. Appl. No. 12/076,439, filed Mar. 18, 2008.
Sekine et al., U.S. Appl. No. 12/232,186, filed Sep. 11, 2008.
Tanaka et al., U.S. Appl. No. 12/416,786, filed Apr. 1, 2009.
Kizuka et al., U.S. Appl. No. 12/418,474, filed Apr. 3, 2009.
Baba et al., U.S. Appl. No. 12/426,756, filed Apr. 20, 2009.
Miyazawa et al., U.S. Appl. No. 12/431,663, filed Apr. 28, 2009.
Nakamura et al., U.S. Appl. No. 12/461,761, filed Aug. 24, 2009.
Higuchi et al., U.S. Appl. No. 12/461,924, filed Aug. 27, 2009.
Higuchi et al., U.S. Appl. No. 12/585,269, filed Sep. 9, 2009.
Mihara et al., U.S. Appl. No. 12/585,458, filed Sep. 15, 2009.
Shimizu et al., U.S. Appl. No. 13/110,279, filed May 18, 2011.
Yoshiyuki Kokojima et al., "Resolution Independent Rendering of Deformable Vector Objects Using Graphics Hardware", Sketches, Siggraph, (2006).
Masaru Suzuki et al., "Sasatto Search" Human Interface Technology for Information Retrieval, Toshiba Review vol. 62, No. 12, 2007, pp. 54-57.
Loviscach, "Motion Blur for Textures by Means of Anisotropic Filtering," Eurographics Symposium on Rendering (2005), pp. 105-110.
Takeuchi et al., "Motion sharpening in moving natural images," Journal of Vision (2002), 2:377 (Abstract).
Brostow et al., "Image-Based Motion Blur for Stop Motion Animation", Proc. of Siggraph '01, pp. 561-566, (2001).
Ramos, et al., "Fluid Interaction Techniques for the Control and Annotation of Digital Video", Proceedings of the 16th annual ACM Symposium on User Interface Software and Technology, vol. 5, Issue 2, pp. 105-114, (2003).
Irani et al., "Efficient Representations of Video Sequence and Their Applications", Signal processing Image Communication (Journal), pp. 1-39, (1996).
Teodosio et al., "Salient Stills", ACM Transaction on Multimedia Computing, Communications and Appllications, pp. 16-36, (2005).
Agarwala et al., "Interactive Digital Photomontage", ACM Siggraph, pp. 1-9, (2004).
Huan-Bo Luan et al., Interactive Spatio-Temporal Visual Map Model Web Video Retrieval, Multimedia and Expo, 2007, IEEE International Conference on, IEEE, P1, Jul. 1, 2007, pp. 560-563, ISBN: 978-1-4244-1016-3. (Abstract).
Office Action dated Apr. 2, 2013 in Japanese Appl No. 2009-049522 with English-language translation.
Shibata, M. et al., Proceedings of Information Science and Technology Forum, 7(3), Aug. 20, 2008, pp. 77-78, URL: http://ci.nii.ac.jp/naid/110007641466.
Office Action dated Jun. 25, 2013 in JP Application No. 2009-049522.
U.S. Appl. No. 12/585,269, filed Sep. 10, 2009.
U.S. Appl. No. 12/426,756.
U.S. Appl. No. 12/416,780.
U.S. Appl. No. 12/418,474.
U.S. Appl. No. 12/461,761, filed Aug. 24, 2009.
U.S. Appl. No. 12/461,924, filed Aug. 27, 2009.

\* cited by examiner

APPARATUS AND METHOD FOR PRESENTING CONTENT

CROSS-REFERENCE TO RELATED APPLICATIONS

This application is based upon and claims the benefit of priority from Japanese Patent Application No. 2009-49522, filed on Mar. 3, 2009; the entire contents of which are incorporated herein by reference.

FIELD OF THE INVENTION

The present invention relates to an apparatus and a method for presenting a content and another content related to the content.

BACKGROUND OF THE INVENTION

As to a PC (Personal Computer), a retrieval function is a general technique widely used in daily business. For example, Web retrieval to retrieve information related with a specified keyword from a Web site on Internet is used by many persons. In the retrieval function with the PC, by inputting a keyword related with things (retrieval objects) from a user, a retrieval result is acquired. Briefly, a retrieval method which the user need actively input the keyword is ordinary. Hereinafter, this retrieval method is called "active retrieval method". Furthermore, IT (Information Technology) of an AV equipment (such as a TV, a DVD recorder, a HDD recorder) is progressing, and the AV equipment is connectable with an Internet. Accompanying with this, the AV equipment prepares the active retrieval function same as the PC.

However, an ability to store a content in the AV equipment, a service of Video-On-Demand (VOD), and a seamlessness of the content between equipments (outside of the AV equipment) or the Internet, are enlarged, and the number of contents accessible by the user increases quickly. Furthermore, the user's style to acquire and view the content by spread of the HDD recorder is changing. Briefly, a style to record the user's desired content is changing as a style to previously record the user's interest contents and select the user's favorite one from the contents, or a passive style (a recommendation service, an automatic recording service). Accordingly, the contents accessible by the user often include one which the user cannot understand.

On the other hand, it is an important problem to effectively select the user's desired content from a group of contents accessible by the AV equipment. As mentioned-above, the user does not always understand all contents because the style to acquire and view the content is changing. Accordingly, when the user retrieves the content using the active retrieval function, the user suitably select a retrieval keyword, and it is difficult for the user to effectively retrieve the user's desired content.

Furthermore, as to the AV equipment, a user is not always strong in the PC. In other words, the user is not always familiar with the active retrieval of keyword input type, which is a general function in the PC. As a result, the active retrieval method in the AV equipment is a function only used by a partial active user. Briefly, this method is not convenient for many users.

In order to solve above-mentioned problem, instead of the active retrieval method, a passive retrieval method is used. As to the passive retrieval method, for example, contents related with some content are presented, and the user selects his/her favorite one from the presented contents (called "relational contents"). In this method, the user's desired content is not actively (positively) searched using the keyword. By setting some content as a retrieval source, relevancy between this content and other contents is presented to the user, and the user implicitly retrieves his/her desired content from the other contents.

Briefly, the user retrieves his/her favorite content without an explicit keyword. As a result, as to a plurality of contents accessible by the AV equipment, while watching a visualized result of relevance among the plurality of contents, the user can passively select the desired one. In this way, in the passive retrieval method, it is very important for the user to visualize the relevancy between contents.

On the other hand, in a field of photograph, various techniques to visualize relationship among a large number of images (taken by a digital camera) are proposed. For example, in WO 00/33572 (Kokai) ( . . . Patent Reference 1), in order to represent a relationship among a plurality of images in time series, the plurality of images is enlarged in order of time series, and spirally displayed from an inner circle to an outer circle in order of time series.

However, as to a dynamic image such as the TV or the video, which is an object of the AV equipment, the image of each frame is changing in order while playing, and the relevancy between images is also changing dynamically. In the technique disclosed in the Patent Reference 1, the dynamic image cannot be processed because a static image is a processing object. Accordingly, as to the content (the dynamic image) changeable with passage of time, it is desired that the relevancy among contents is visualized with the change.

SUMMARY OF THE INVENTION

The present invention is directed to an apparatus and a method for visually presenting contents related to the processing source content changing with passage of time.

According to an aspect of the present invention, there is provided an apparatus for presenting contents, comprising: a selection unit configured to select a first content as a processing object; a timer configured to generate a time information; a detection unit configured to detect a change of at least a part of the first content based on the time information; a layout unit configured to acquire a second content as a next processing object after the change is detected, a third content related to the first content and a fourth content related to the second content, and symbolically lay out the second content, the third content and the fourth content in a virtual space; and a presentation unit configured to visually present the virtual space.

DETAILED DESCRIPTION OF THE EMBODIMENTS

Figure 1:
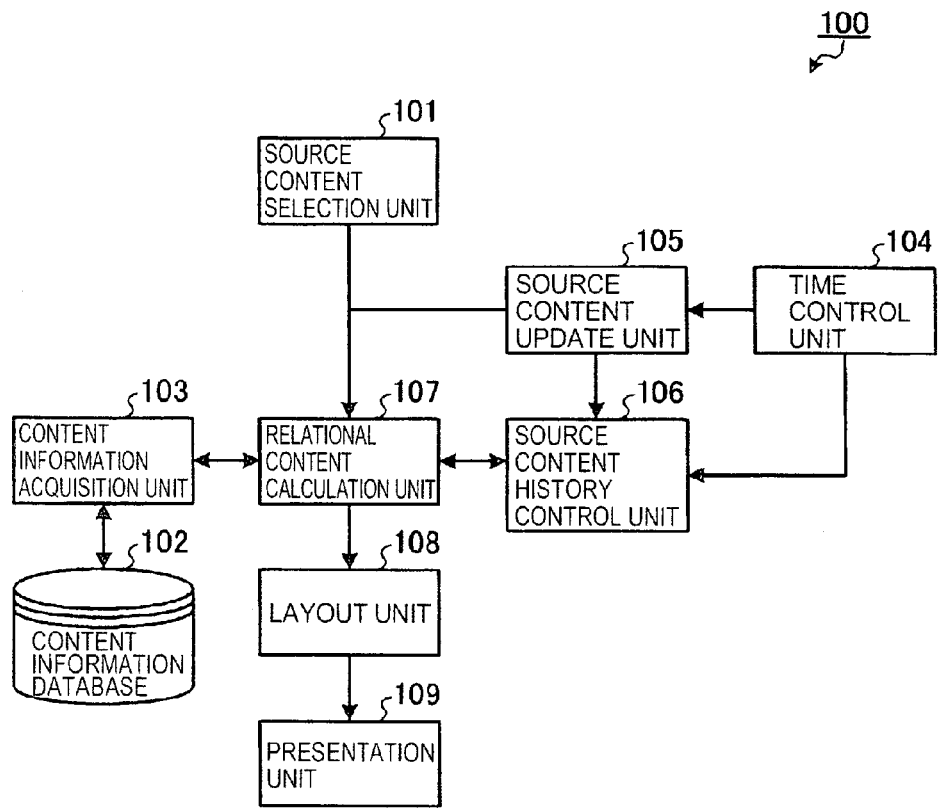
FIG. 1 is a block diagram of a content presentation apparatus 100 of the first embodiment.

Hereinafter, embodiments of the present invention will be explained by referring to the drawings. The present invention is not limited to the following embodiments.

The First Embodiment (1) Component:

A content presentation apparatus includes a controller comprising a CPU (Central Processing Unit) and a GPU (Graphics Processing Unit), a storage unit comprising a ROM (Read Only Memory), a RAM (Random Access Memory) or a HDD (Hard Disk Drive) each storing various program and various data (image, video), a communication unit communicating with an external apparatus, and a bus connecting thereof. The content presentation apparatus has a hardware component using a regular computer. Furthermore, as to the content presentation apparatus, a display unit displaying information, and an operation input unit (such as a keyboard or a mouse) accepting an input of the user's indication, are (wirelessly or wired-) connected. The display unit is a display device such as a CRT (Cathode Ray Tube) or a liquid crystal monitor. The operation input unit is an input device preparing an operation key, an operation button or a mouse to input the user's operation.

Next, in this hardware component, each function realized by executing each program stored in the storage unit with the CPU in the content presentation apparatus is explained. FIG. 1 is a block diagram of the content presentation apparatus 100. The content presentation apparatus 100 includes a source content selection unit 101, a content information database 102, a content information acquisition unit 103, a time control unit 104, a source content update unit 105, a source content history control unit 106, a relational content calculation unit 107, a layout unit 108, and a presentation unit 109. The source content selection unit 101, the content information acquisition unit 103, the time control unit 104, the source content update unit 105, the source content history control unit 106, the relational content calculation unit 107, the layout unit 108 and the presentation unit 109, are generated into the storage unit (such as the RAM) in case of executing the program by the CPU. The content information database 102 is a memory region secured in the storage unit (such as the HDD).

The content information database 102 correspondingly stores a content and metadata (content information) of the content. Concretely, in case of indicating a specified content, the content information database 102 supplies metadata corresponding to the content. Furthermore, in case of indicating a predetermined item of the specified content, the content information database 102 supplies information corresponding to the predetermined item of the metadata. At the same time, in case of presenting a predetermined keyword, the content information database 102 retrieves metadata (or item of the metadata) including the keyword, and presents a retrieval result representing which metadata (or which item of metadata) matches the keyword and which content correspond the metadata. This function is called "relational database function".

In this case, "content" is defined as a block of information viewed by a person, i.e., digital data of a video, an image, music, text, or combination thereof. As an example of the video, a TV broadcasting program, a commodity such as a cinema or a video clip delivered/sold/distributed by a recording medium (such as a DVD) or a VOD service, a dynamic image delivered on Web, a dynamic image taken by a camera or a cellular-phone with a camera function, and a program recorded by a video recorder, an HDD recorder, a DVD recorder or TV/PC having recording function, are listed. As an example of the image, digital photograph data taken by a digital camera are listed. As an example of the music, a music album sold/distributed as a memory medium (such as a CD), and tune data (for example, MP3 data) delivered/sold/distributed via an on-line store of the Web, are listed.

The metadata (content information) of the content is a group of information belonging to the content, and mainly information for the purpose to explain the content. For example, if the content is a TV program, the metadata is a group of a title, a sub-title, a broadcasting station, a broadcast type, a broadcast start date (time), a broadcast end date (time), a broadcast time length, contents of the program, a performer information, a program genre information, a producer information, and a caption information.

For example, in case of a TV program by a Japanese digital terrestrial broadcasting, ARIB (Association of Radio Industries and Businesses) prescribes a standard format to set the group of above-mentioned information. In the digital terrestrial broadcasting, a broadcasting wave on which metadata is superimposed as the prescribed format is delivered. In the same way, as to another kind of content, a standard format is often prescribed. For example, if the content is a photograph taken by a digital camera, as to metadata of the content, a format advocating as Exif (Exchangeable Image File Format) is widely used (de facto standard).

The metadata is not always sold/delivered/distributed by a content creator or a distributor, after assigning the metadata to the content thereby. The metadata is often assigned to the content by a user afterward. For example, if the content is a photograph taken by a digital camera, the user often adds a comment text to the content afterward, in order to discriminate the photograph. Furthermore, a person except for the creator and the distributor often assigns the metadata using any method. For example, in a recent video recorder (including the HDD recorder), a scene change or a CM (commercial) part is automatically detected from a TV broadcast program recorded, and this change information is automatically added as chapter information to the TV broadcast program. In such equipment, a function to detect a scene change is previously installed. The chapter information is generated using this function, and added as metadata. Above explanation is only one example. Metadata has various formats, i.e., the metadata is one unit of additional information related with some content, and information arranged by each item according to a predetermined rule.

The metadata includes metadata of all of the content, and metadata of a part of the content. In case of TV program, metadata includes a title, a sub-title, a broadcasting station, a broadcast type, a broadcast start date (time), a broadcast end date (time), a broadcast time length, contents of the program, a performer information, a program genre information, a producer information, and a caption information. In these data, the title, the sub-title, the broadcasting station, the broadcast type, the broadcast start date (time), the broadcast end date (time), the broadcast time length, the contents of the program, the performer information, the program genre information, and the producer information, are metadata of all of the content. On the other hand, in a closed caption information (one datum stored as the caption information), contents information corresponding to a position of broadcasting time of the TV program is supplied. Concretely, contents "OOO" is broadcasted in a period of "1~5" minutes passed from the broadcast start time, and contents "XXX" is broadcasted in a period of "6~10" minutes passed from the broadcast start time, i.e., a pair of text representing a time schedule and the broadcast contents is supplied. In this case, (a part of) the closed caption information is metadata of a part of content based on time. In case of the chapter information to the content, program contents and a chapter name in some chapter segment are stored as the metadata. This is also one example of the metadata of the at least of the content.

For example, correspondence between metadata and the content is explained. A content identifier (ID) to identify the content is assigned to the content, and the content identifier is corresponded with the metadata. The content identifier is a content name or a content number.

Hereinafter, in order to simplify the explanation, the content presentation apparatus 100 is AV (audio visual) equipment or a recording equipment of a TV program, the content is the TV program, and metadata is assigned to the TV program. In the case of the AV equipment of the TV program, the content presentation apparatus 100 is a TV set, a video recorder or a personal computer (having AV view function), each includes a function to display the TV program (broadcasted from a broadcasting station) on a screen. In the case of the recording equipment of TV program, the content presentation apparatus 100 is a TV set (having a recording function), a video recorder or a personal computer (having AV recording/view function), each includes a function to record a TV program and play the recorded TV program. However, forms of the content and the content presentation apparatus are not limited to above examples.

In FIG. 1, the source content selection unit 101 selects a content as a present processing object. Hereinafter, the content selected by the source content selection unit 101 is called "processing source content". In order to select the processing source content, following various methods can be applied.

(a1) Selection from TV Program List Supplied as EPG (Electric Program Guide):

In AV equipments of TV program widely spread, a GUI (Graphical User Interface) screen to select a program by referring to a program list (EPG) similar to TV program list of a news paper is provided. In this screen (EPG screen), typically, programs of one week broadcasted on digital terrestrial broadcasting, BS digital broadcasting and CS digital broadcasting, are listed as a TV program list by classifying into each channel with date (time). From this TV program list, a TV program selected by a user via an operation input unit is set to the processing source content.

(a2) Selection from a List of TV Programs Recorded:

In recording equipments of TV program widely spread, the GUI screen to select a program by referring to a list of TV programs recorded is provided. From the list of TV programs on the GUI screen, a TV program selected by a user via the operation input unit is set to the processing source content.

(a3) Selection from a List of TV Programs Presently Broadcasting (Live Broadcasting):

In AV equipments of TV program widely spread, by changing a channel or a broadcasting type via the operation input unit, the user can select and view a program presently broadcasting. Furthermore, some AV equipment presents a list of TV programs presently broadcasting on the GUI screen. If the content presentation apparatus 100 is such AV equipment, from the list of TV programs on the GUI screen, a TV program selected by the user via the operation input unit is set to the processing source content.

(a4) Selection from a List of TV Programs Listed Based on Another Predetermined Reference:

For example, as to general AV/recording equipment of TV program, a function to search a TV program (a TV program having a specified keyword is searched from EPG screen, and the search result is listed, or a TV program belonging to specified genre is searched, and the search result is listed) is prepared. From the list of TV programs (search result) on the GUI screen, a TV program selected by the user via the operation input unit is set to the processing source content. The list of TV programs by this search function means TV programs listed based on another predetermined reference. However, another predetermined reference is not limited to this search function, but applied to all functions to list TV programs.

(a5) Selection of a Regular TV Program:

The regular TV program means a TV program which is a source content according to a predetermined rule. For example, a TV program presently viewed (a TV program broadcasting on a channel presently selected, or a TV program (recorded) presently replaying) is selected as the processing source content. If any content is not viewed presently, a content most previously viewed may be selected as the processing source content. Furthermore, by preparing a profile information (indicating a specified keyword or user's liking), the processing source content may be automatically selected based on the profile information. For example, in case of "succor program" as the profile information, a content having program information "succor program" is selected as the processing source content. Furthermore, by storing a user's operation history (operation history information) to the content presentation apparatus 100, a TV program which the user often viewed may be selected as the processing source content based on the operation history information. For example, the case that the user often viewed means, in the operation history information, the number of contents corresponding to metadata of the same program information is above a threshold.

The content information acquisition unit 103 acquires metadata corresponding to the content is acquired. Concretely, in response to a content identifier of a predetermined content, the content information acquisition unit 103 retrieves all or a part of items of metadata corresponding to the content identifier from the content information database 102. In case of TV program, as the part of items of metadata, for example, program contents are retrieved. As to the part of items of metadata, the content information acquisition unit 103 acquires based on a predetermined reference. The reference is, regularly, a time, chapter information, or a specified keyword. In case of the closed caption information, as to the reference "Is information matched after OO minutes from start time of broadcast?", a program as a segment including this time is acquired. In this case, the content information acquisition unit 103 may acquire a segment corresponding a period including the time (after OO minutes from start time of broadcast. Furthermore, the reference is not limited to above-mentioned example. For example, if the content presentation apparatus 100 includes a function to calculate a surge degree of a TV broadcast by analyzing acoustic information included in all the TV broadcast, "a part having the surge degree above a predetermined threshold" may be set to the reference. Furthermore, if the content presentation apparatus 100 includes a function to estimate a person appeared in a TV broadcast by analyzing image of the TV broadcast, "a segment in which a specified person appears" may be set to the reference. The reference is not limited to above-mentioned examples.

The time control unit 104 controls time information. Concretely, the time control unit 104 times the date, the present time and day of the week, and outputs as a time information. Furthermore, the time control unit 104 calculates a difference between the present data and a specified data, a difference between the present time and a specified time, and a difference between two specified days, and outputs as the time information.

Based on the time information (controlled by the time control unit 104), the source content update unit 105 detects a change of the processing source content (presently selected by the source content selection unit 101), and updates the processing source content. Concretely, the source content update unit 105 decides whether the processing source content (presently selected by the source content selection unit 101) is valid. In case of invalid, by retrieving a valid content, the source content update unit 105 selects the valid content as a new processing source content, and updates the processing source content to the new processing source content.

As mentioned-above, the source content selection unit 101 selects the processing source content using various methods. For example, the source content selection unit 101 selects a TV program presently broadcasted via a channel (presently selected) as the processing source content. In this case, after the present time is over a broadcast end time of the TV program, a TV program presently broadcasted via this channel is different from the processing source content selected by the source content selection unit 101. For example, a program A is broadcasted in a period "13:00~15:00" via a channel A, and a program B is broadcasted from "15:00" via the channel A. When the source content selection unit 101 selects the processing source content at "14:50", the program A is set to the processing source content. However, at "15:00" when ten minutes has passed from 14:50, broadcast of the program A is completed, and the program B starts to be broadcasted. In this case, the source content update unit 105 automatically updates the processing source content.

A condition to decide whether the content is valid is as follows.

(b1) Assume that a processing source content is selected from "TV programs presently broadcasted" (irrespective of selection method). When the present time (generated from the time control unit 104) is not over a broadcast end time of the processing source content, the processing source content is valid. When the present time is equal to or over the broadcast end time, the processing source content is invalid.

(b2) Assume that the processing source content is selected from a TV program except for "TV programs presently broadcasted". The processing source content is always valid.

The condition to decide whether the content is valid is not limited to above example, and may be suitably changed as follows.

(c1) Assume that the processing source content is a video content as VOD delivery and selected by the source content selection unit 101 while delivering the video content. When the present time is equal to or over a delivery end time of the video content, the processing source content is invalid.

(c2) Assume that the processing source content is selected from "TV programs presently broadcasted" (irrespective of selection method). When the present time is equal to or over a broadcast end time of the processing source content, if the processing source content is already recorded, the processing source content is valid. Furthermore, if the processing source content is selected from "TV programs to be broadcasted in future", the same decision condition may be used.

When the source content update unit 105 updates the processing source content, the source content history control unit 106 sets the processing source content (before updating) to a content as a previous source content, and updates a history of the past processing source content. Concretely, at timing when the source content update unit 105 updates the processing source content, the source content history control unit 106 stores the previous processing source content and the update time as processing source history information. The number of the previous processing source content is not limited to one. The previous processing source contents as arbitrary units and update order of the contents are stored as the processing source history information.

Figure 2:
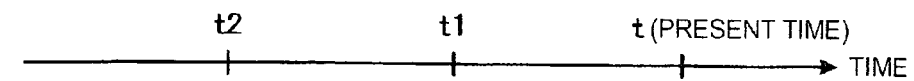
FIG. 2 is a schematic diagram showing a transition of processing source content.
Figure 2:
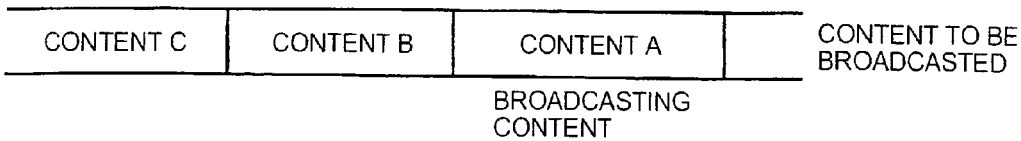
Figures 3, 4:
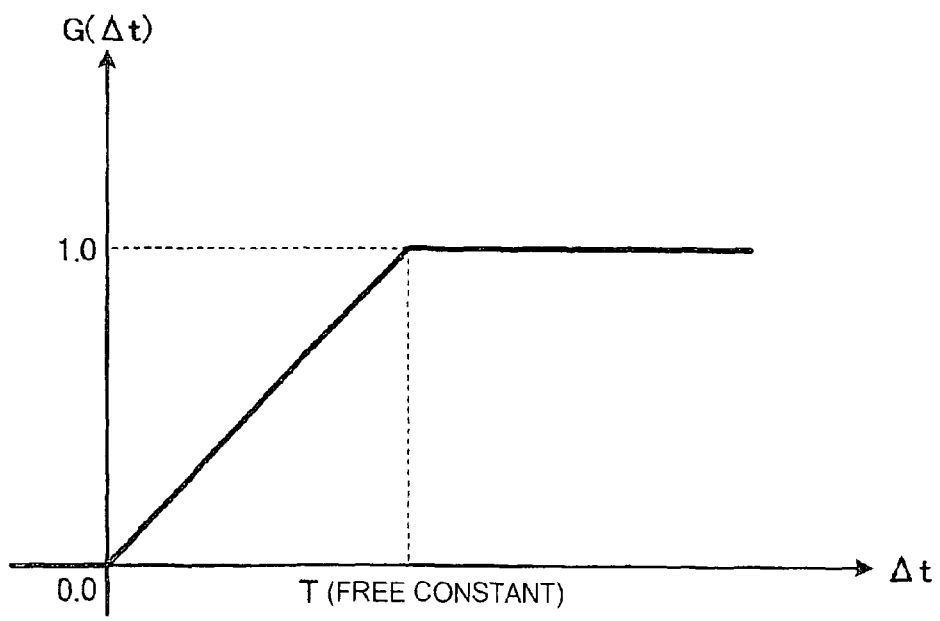
FIG. 3 is a schematic diagram of histeresis information of the processing source content in FIG. 2.
FIG. 4 is a graph showing a function G($\Delta t$).

FIG. 2 shows transition of processing source content in time series. For example, a content C is broadcasted until time t2, a content B is broadcasted from time t2 to time t1, a content A is broadcasted from time t1, and the content A is continually broadcasted at the present time t. FIG. 3 shows one example of the processing source history information corresponding to transition of the processing source content in FIG. 2. For example, at broadcast end time of the content B, the contents B was the processing source content. In this case, the content B and the broadcast end time (update time) are stored as the processing source history information. The broadcast end time (update time) may be acquired from time information generated from the time control unit 104. If metadata corresponding to the content includes the broadcast end time, the broadcast end time may be acquired from the metadata. The method for acquiring the broadcast end time is not limited to above example.

The relational content calculation unit 107 specifies a content related to the present processing source content selected by the source content selection unit or updated by the source content update unit 105, and a content related to the past processing source content stored in the source content history control unit 106. Then, the relational content calculation unit 107 acquires metadata corresponding to each of specified contents (candidate contents), the present processing source content and the past processing source content from the content information database 102 via the content information acquisition unit 103, and calculates a relevance between each of the specified contents and each of the present processing source content and the past processing source content, using the metadata. The relational content calculation unit 107 lists a plurality of contents each having the relevance in higher order from candidate contents. The plurality of contents listed is called "relational content". The number of the contents listed (relational contents) may be limited. Alternatively, all candidate contents may be listed without limiting the number.

The candidate content (specified candidate for relational content) is, concretely, a content to be selected as the processing source content by the source content selection unit 101. At least one candidate content exists. This content (a selection source content) is changed by realization form of the content presentation apparatus 100. In case that the content presentation apparatus 100 is AV equipment or recording equipment of TV program, typically, contents listed on the GUI screen (presenting EPG information) and contents (corresponding to the number of channels) presently broadcasted are regarded as selection source contents. Furthermore, in case that the content presentation apparatus 100 is the recording equipment of TV program, a content recorded by the apparatus 100 are regarded as the selection source content.

Recently, the AV equipment or the recording equipment of TV program mutually connectable with another equipment using DLNA (Digital Living Network Alliance) function exists. In this case, a content stored in the another equipment is regarded as the selection source content. Furthermore, in case of an IPTV view equipment or the equipment connectable with a VOD service or a Network, a content provided by IPTV, a content provided by a VOD service and a content existing on the Network are regarded as the selection source content. These selection source contents are candidate contents for the relational content, and objects to calculate the relevance. From the candidate contents (a set of source contents to calculate the relevance), a plurality of contents is listed in higher order of the relevance, as the relational contents.

As to the relevance, the calculation method used by a relevance calculation unit 17 disclosed in JP-A 2009-80580 (Kokai) ( . . . Patent reference 2) is applied. In this case, a relevance r between a processing source content X and some content Y is calculated by a function F, as following equation (1).

$$r = F(X, Y) \quad (1)$$

This calculation example is described in the patent reference 2. As to actual value of X and Y, at least one item included in metadata is used. For example, actual value of X is a broadcast start date (time) of the content X, and actual value of Y is a broadcast start date (time) of the content Y. The function F(X,Y) becomes larger if the broadcast start date of X is nearer to the broadcast start date of Y. The function F(X, Y) becomes smaller if the broadcast start date of X is farther from the broadcast start date of Y.

In the first embodiment, a source content used for calculation of the relevance different from that in the patent reference 2. In this reference, the source content is the processing source content and a content of a calculation object of the relevance. However, in the first embodiment, a next processing source content (updated by the source content update unit 105) and a past processing source content (controlled by the source content history control unit 106) are further included.

An example that above-mentioned relevance is applied to the first embodiment is explained. In the first embodiment, the relational content calculation unit 107 calculates a relevance R using a following equation (2).

$$R = G(\Delta t) \times F(X, Y) + (1 - G(t)) \times F(Z, Y) \quad (2)$$

In the equation (2), X represents a processing source content, Y represents a candidate content of a relational content, and Z represents a previous processing source content in past processing source contents (controlled by the source content history control unit 106). As actual values of X, Y and Z, at least one item included in metadata corresponding to the content is respectively used. "$\Delta t$" represents a passing time after selecting (or updating to) the present processing source content. Briefly, if the present processing source content is selected by the source content selection unit 101, "$\Delta t$" represents a passing time from the selection time to the present time. If the present processing source content is newly updated by the source content update unit 105, "$\Delta t$" represents a passing time from the update time to the present time. "$G(\Delta t)$" is a function of an interval "$\Delta t$", and outputs a value within "0"~"1" based on "$\Delta t$". For example, "$G(\Delta t)$" is realized as a function shown in FIG. 4. In this case, "$G(\Delta t)$" is not limited to the function in FIG. 4, and may be any function matched with above-mentioned condition.

A concrete example to calculate the relevance is explained. Assume that the processing source content transits as shown in FIG. 2, the processing source history information is stored as shown in FIG. 3, the present time is t, a processing source content presently broadcasted is a content A, a previous processing source content is a content B, the update time from the content B to the content A is t1, and a candidate content is a content Y. In this case, a passing time is "t−t1", and a relevance R is calculated by a following equation (3).

$$R = G(t-t1) \times F(A, Y) + (1 - G(t-t1)) \times F(B, Y) \quad (3)$$

With regard to the relevance R, as the passing time is nearer to "T (arbitrary constant)", a contribution ratio of relevance between X and Y (calculated by F(X,Y)) becomes larger. On the other hand, as the passing time is nearer to "0", a contribution ratio of relevance between Z and Y (calculated by F(Z,Y)) becomes larger. Briefly, if a passing time from selection of or update to the present processing source content is not so long, a relevance ratio with a previous processing source content Z is larger while a relevance ratio with the present processing source content X is smaller. If the passing time becomes longer, the relevance ratio with the present processing source content X is larger while the relevance ratio with the previous present processing source content Z is smaller.

In the equation (3), as the past processing source content used for calculation of the relevance, the previous processing source content (immediately before the present processing source content) is used. However, the past processing source content before a plurality of contents from the present processing source content may be used. In this case, the relevance is calculated by following equation (4).

$$R = G(\Delta t) \times F(X, Y) + \Sigma(1 - G_n(\Delta t)) \times F(Z_n, Y) \quad (4)$$

In the equation (4), "$Z_n$" is a processing source content before n-units from the present processing object, and "$G_n(\Delta t)$" is a function to determine a weight of the processing source content "$Z_n$", which satisfies "$\Sigma G_n(\Delta t)=1$".

Based on the relevance calculated by the relational content calculation unit 107, the layout unit 108 symbolically lays out at least one content included in relational contents (specified by the relational content calculation unit 107) and the present processing source content into a virtual space. Then, the layout unit 108 visualizes the virtual space, and presents the visualized virtual space via the presentation unit 109.

Concretely, from relational contents specified by the relational content calculation unit 107, the layout unit 108 selects a relational content to be laid in the virtual space, according to a predetermined condition. The predetermined condition is, for example, the number of relational contents, the relevance degree (calculated by the relational content calculation unit 107) above a threshold, a broadcast date (or recording date) within a predetermined range, or a specified genre, but not limited to them. A condition originated from metadata corresponding to the relational content may be set to the predetermined condition. As to a method for selecting the relational content, the method used by the display source content selector in the patent reference 2 is applied.

The layout unit 108 symbolizes the present processing content and the relational content (selected as mentioned-above) respectively, and lays out them into a first-dimensional space, a second-dimensional space or a third-dimensional space (virtual space) based on their relevance. Then, the layout unit 108 visualizes the virtual space, and presents the visualized virtual space via the presentation unit 109. As to a method for symbolizing the content, the method used by the content visualization unit in the patent reference 2 is applied. As to a method for laying out the content, the method used by the visualized content layout unit in the patent reference 2 is applied. As to a method for visualizing the virtual space, the method used by the space visualization unit in the patent reference 2 is applied.

For example, as to symbolization and layout of the content, by using all or a part of items included in metadata corresponding to the content, the layout unit 108 generates an image (representing the content as a picture or a text), and lays out the image in the virtual space. In this case, the present processing source content is laid at the origin, and each relational content is laid around the origin so that the relevance of the relational content is larger as the relational content is nearer to the origin. Furthermore, as to visualization of the virtual space, the virtual space (each content is symbolically laid out) is rendered, and an image representing the virtual space is generated.

Figure 5:
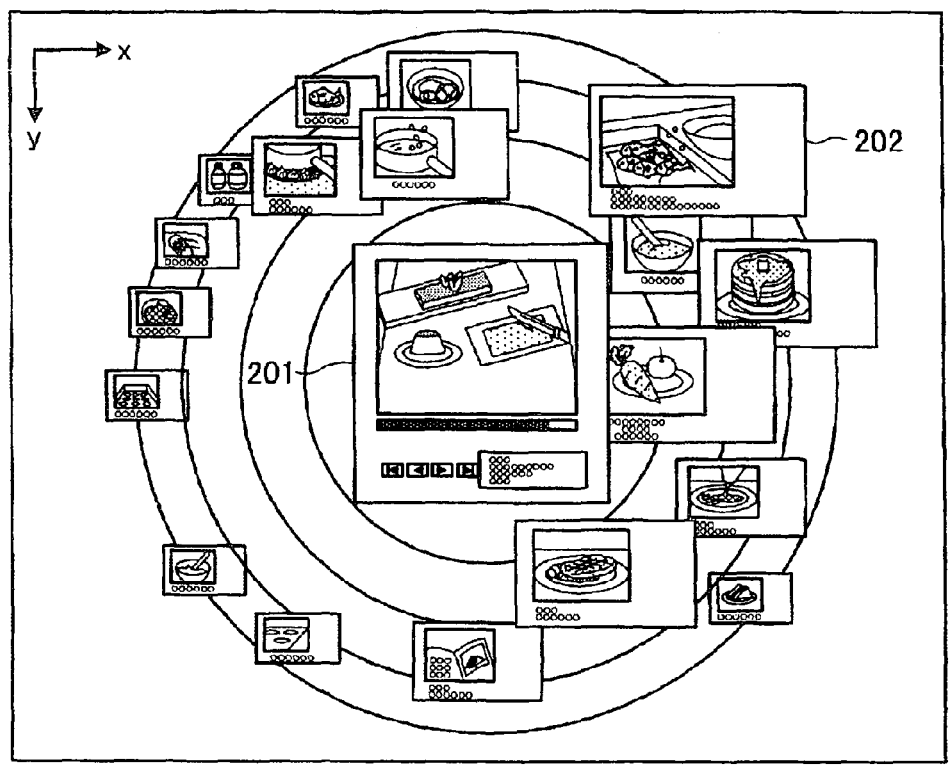
FIG. 5 is an example of a visualized processing result by a layout unit 108 in FIG. 1.

FIG. 5 is one example of visualization processing result by the layout unit 108. In FIG. 5, by centering a processing source content 201 in the image, a relational content 202 is centrically laid around the processing source content 201 based on the relevance. Each content is visualized using a thumbnail and a title included in metadata. The relevance of each content may be visualized in correspondence with the content.

The presentation unit 109 displays the image representing the virtual space (visualized by the layout unit 108) via a display. Briefly, by presenting the virtual space, the present processing source content and the relational content are presented.

Figure 6:
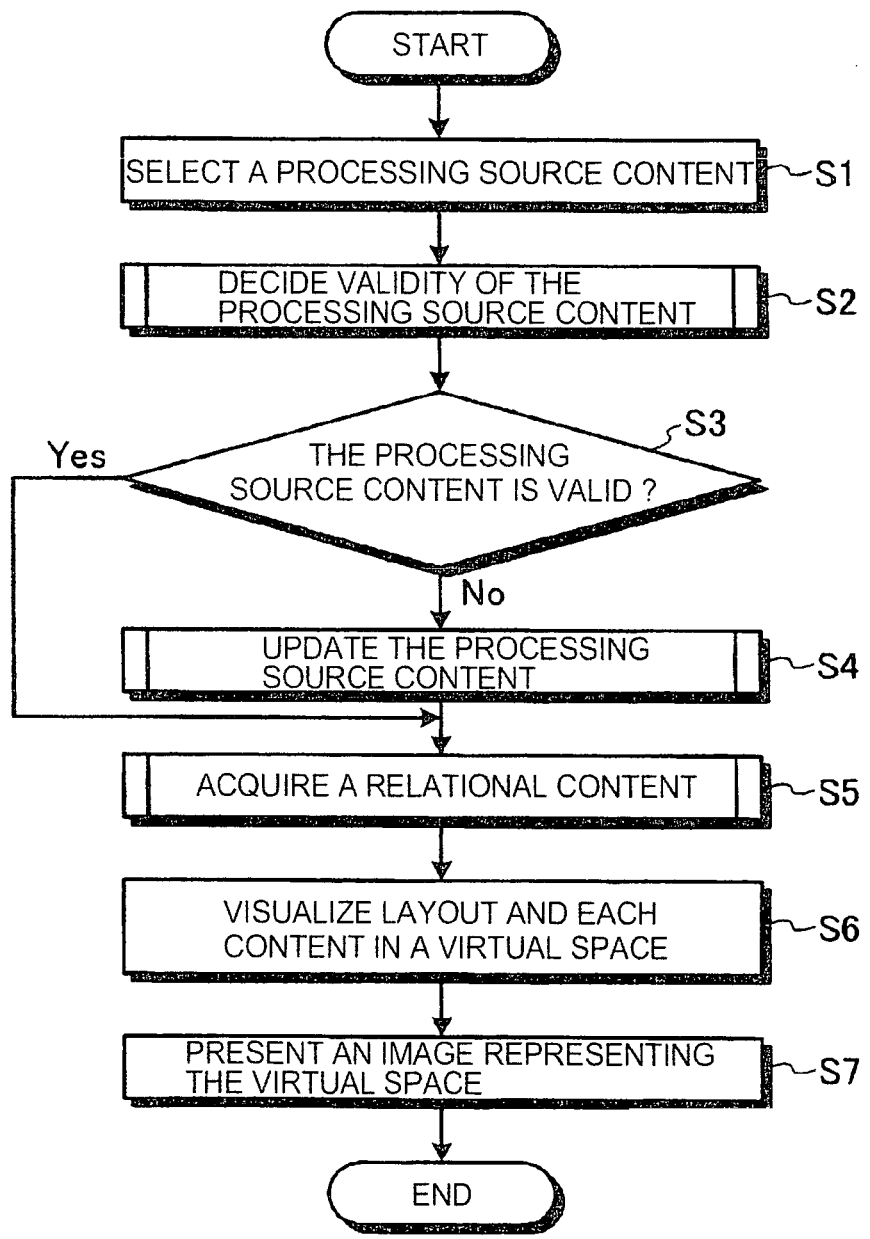
FIG. 6 is a flow chart of content presentation processing by a content presentation unit 100.

(2) Operation:

Next, processing of the content presentation apparatus 100 of the first embodiment is explained by referring to FIG. 6. At S1, in the content presentation apparatus 100, the source content selection unit 101 selects a present processing source content. This selection method is explained as mentioned-above. At S2, the source content update unit 105 decides validity of the present processing source content (selected at S1).

Figure 7:
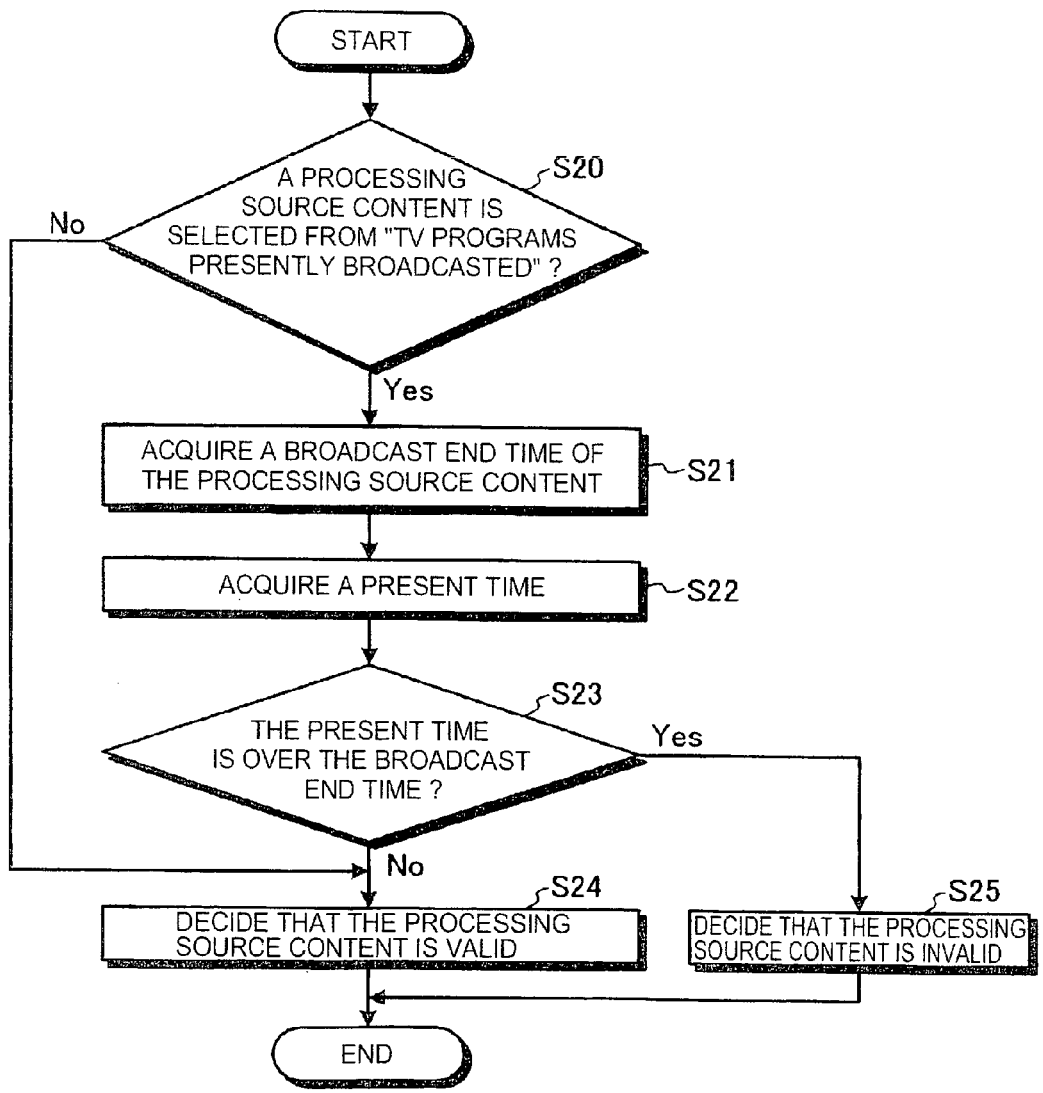
FIG. 7 is a flow chart of processing to decide a validity of the processing source content at S2 in FIG. 6.

FIG. 7 is a flow chart of detail processing to decide validity of the present processing source content. At S20, it is decided whether the present processing source content is selected from "TV program presently broadcasted". If the present processing source content is selected from "TV program presently broadcasted" (Yes at S20), at S21, a broadcast end time of the processing source content is acquired by referring to metadata stored in the content information database 102. At S22, the present time is acquired from the time control unit 104. At S23, it is decided whether the present time (acquired at S22) is over the broadcast end time (acquired at S21). If the present time is not over the broadcast end time (No at S23), at S24, it is decided that the processing source content is valid. If the present time is over the broadcast end time (Yes at S23), at S25, it is decided that the processing source content is invalid.

In FIG. 6, at S3, as a processing result of S2, it is decided whether the processing source content is valid. If the processing source content is invalid (No at S3), at S4, the source content update unit 105 updates the processing source content.

Figure 8:
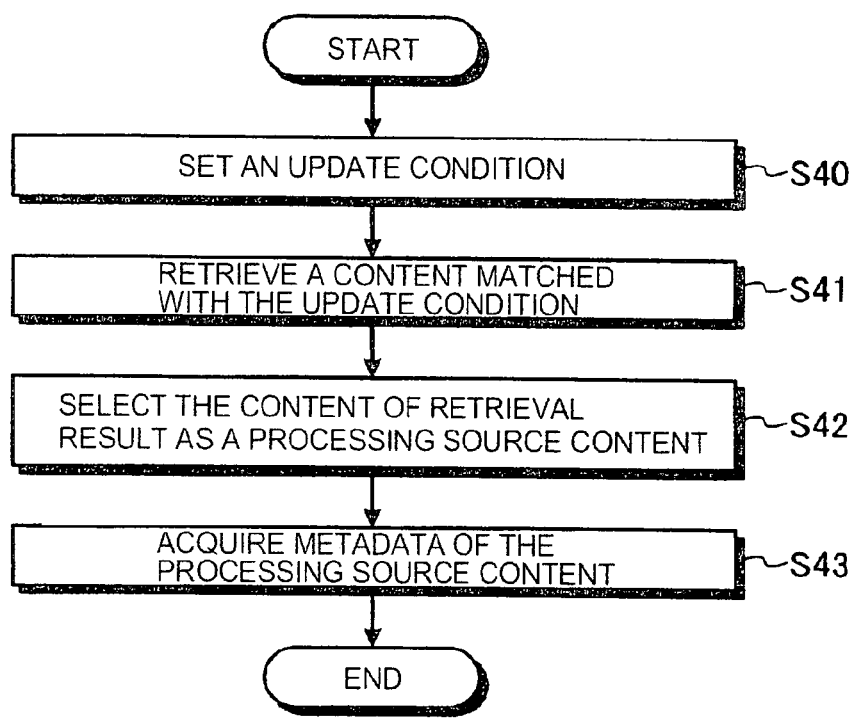
FIG. 8 is a flow chart of detail processing to update the processing source content at S4 in FIG. 6.

FIG. 8 is a flow chart of detail processing to update the processing source content. At S40, an update condition is set. For example, the update condition is "TV program presently broadcasted via a channel presently selected". At S41, a content matched with the update condition is retrieved. For example, by using EPG information, a content as "TV program presently broadcasted via a channel presently selected" is retrieved. At S42, by selecting the content (retrieval result at S41) as a new processing source content, the present processing source content is updated. At S43, the content information acquisition unit 103 acquires metadata corresponding to the new processing source content (updated at S42) from the content information database 102.

Figure 9:
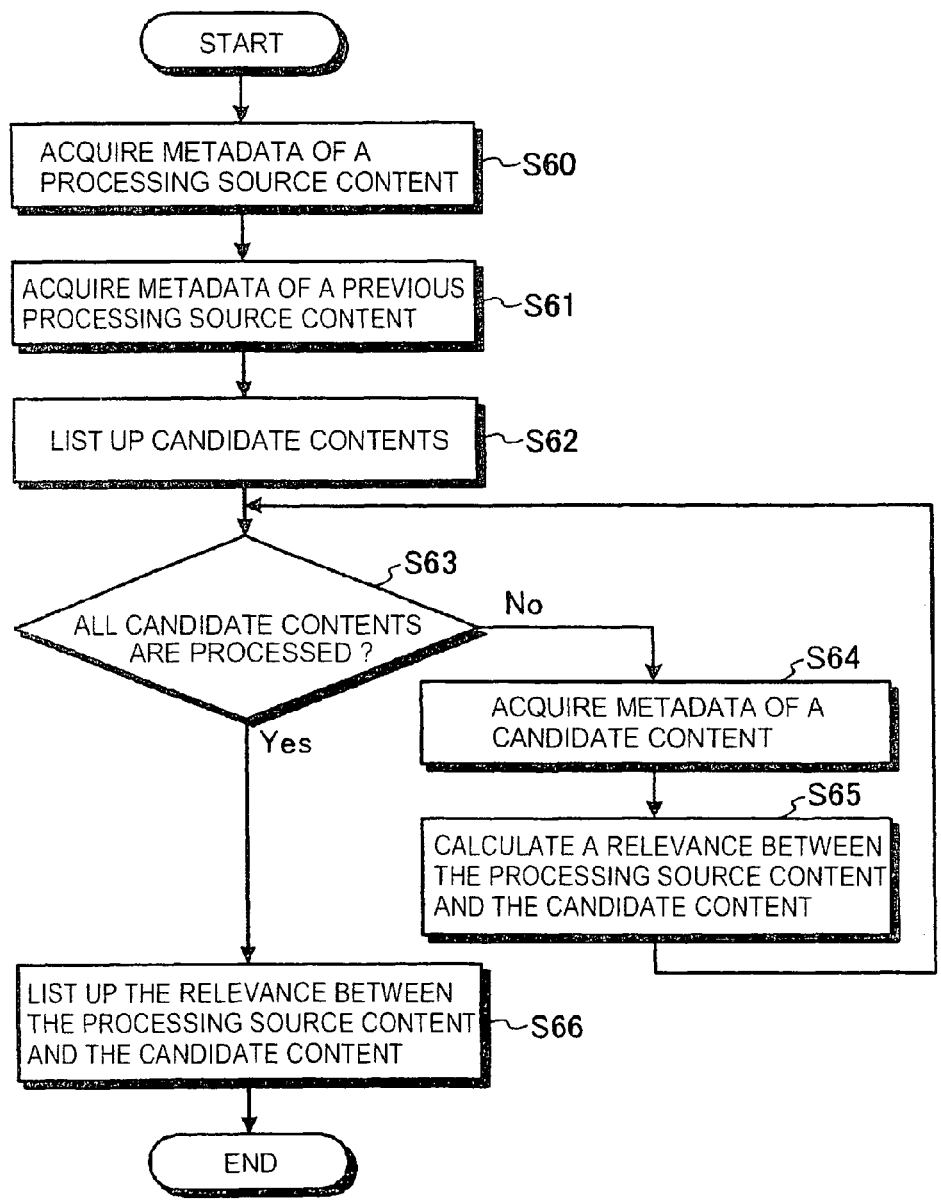
FIG. 9 is a flow chart of detail processing to specify a relational content.

In FIG. 6, at S5, the relational content calculation unit 107 specifies a relational content. FIG. 9 is a flow chart of detail processing to specify the relational content. At S60, metadata corresponding to the present processing source content is acquired from the content information database 102. The present processing source content is, a content selected at S1 and not updated at S4, or a next content updated at S4. At S61, metadata corresponding to the past processing source content represented in processing source history information (controlled by the source content history control unit 106) is acquired from the content information database 102. At S62, a content as a candidate of the relational content is listed. Hereinafter, the content as the candidate is called a candidate content. Following processing is executed for the candidate content.

At S63, it is decided whether all of candidate contents are already processed. If at least one candidate content is not processed yet (No at S63), at S64, metadata corresponding to the at least one candidate content is acquired from the content information database 102. At S65, by using metadata of the present processing source content (acquired at S61), metadata of the past processing source content (acquired at S62) and metadata of the candidate content (acquired at S64), the relevance is calculated by the equation (2).

After S65, processing is returned to S63. If all candidate contents are already processed (Yes at S63), at S66, from the all candidate contents, the candidate content with the relevance is listed in order of higher relevance. Each of contents listed is specified as the relational content.

In FIG. 6, at S6, the layout unit 108 symbolically lays out each of the relational contents (specified at S5) and the present processing source content in a virtual space, and visualizes the virtual space. For example, this visualized result is shown in FIG. 5. At S7, the presentation unit 109 displays an image representing the virtual space (visualized at S6) via a display.

As mentioned-above, as to a TV program of the present processing source content, another TV program related to the TV program is presented as the relational content. Accordingly, the user can easily view which content exists in relation to the present specified content. Concretely, for example, in case that one TV program is selected as the processing source content using EPG, the user can view which TV programs related to the one TV program are included in EPG of one week. As a result, the user can reserve recording of all TV programs related. As to the prior art, in order to operate the same reservation via a EPG screen, the user need search the related TV program by watching TV programs listed on the EPG screen. Furthermore, the user need search his/her desired TV program using above-mentioned program search function. In former case, it takes a long time for the user to search TV programs in all channels of one week, and this is not actual search method. In latter case, the user must consider a suitable keyword. If the user considers unsuitable keyword, the user's desired TV program cannot be searched. On the other hand, in the first embodiment, by presenting TV programs related to the (present and past) processing source content, the user can reserve all TV programs related, at once.

In case that a recorded TV program is the present processing source content, the same operation is possible for the user. In this case, by presenting another recorded TV program (as a relational content) related to the recorded TV program, the user can utilize the relational content as a candidate to view the other recorded TV program. Furthermore, by presenting TV programs scheduled to be broadcasted hereafter (as a relational content) related to the recorded TV program, the user can utilize the relational content as a candidate to reserve recording of TV programs scheduled to be broadcasted.

Furthermore, irrespective of a type of content, the relational content can be specified. For example, as to a TV program on some digital terrestrial broadcasting, a dynamic image (delivered on Network) related to the TV program is specified as the relational content. In this case, the user can search his/her desired content from relational contents over the type of content.

Recently, the number of contents accessible by the user are rapidly increasing. Accordingly, as shown in the first embodiment, it is important to support the user to search his/her desired content from many contents, and it is important to present significant content for the user to urge to view or record. In the patent reference 2, based on relevance between contents, a content highly related to some content is listed, and dynamically visualized. Briefly, by presenting the relational content, the user can be urged to select the significant content. However, in the patent reference 2, if the processing source content (as a source to present the relational content) changes with passage of time, the user's utility is damaged.

For example, even if a TV program (selected as the processing source content) is presently broadcasted, time is passing while the user is operating the content presentation apparatus. As a result, the TV program is completely broadcasted, and a next TV program starts to be broadcasted, i.e., the processing source content changes. In this case, in the patent reference 2, the next TV program is set to a next processing source content, and relational contents of the next processing object are specified. In general, before and after change of the processing source content, the relational content largely changes. Because, if the processing source content is not correlative with the next processing source content, the relational content of the processing source content is not also correlative with the relational content of the next processing source content.

If a user changes the processing source content intentionally, a problem does not occur. However, irrespective of the user's intention, when the processing source content changes with passage of time, the relational content also changes before and after change of the processing source content, and the user is confused. For example, assume that relational contents of the processing source content (before change) are presented, and a user is searching a content to be viewed or recorded from the relational contents. If the relational contents are changed by change of the processing source content, the relational contents to be searched by the user are not presented. Briefly, the relational contents are discontinuously changed, and the user cannot continue to search from the relational contents on condition before change of the processing source content.

However, in the first embodiment, when the processing source content is changed, a new processing source content and previous processing source content are taken into consideration, and contents related to each of the new processing source content and the previous processing source content are presented. Accordingly, immediately after the (previous) processing source content is changed to the new processing source content, contents related to the previous processing source content are mainly presented. As time has passed, these relational contents are not presented gradually. On the other hand, contents related to the new processing source content are presented gradually as time has passed. When a predetermined time (T in FIG. 4) has passed, the contents related to the new processing source content are only presented.

In this way, in the first embodiment, even if the processing source content is changed with passage of time, relational contents to be presented are continually changed. Accordingly, it is avoided that the user suddenly misses a content to be searched. At the same time, new contents related to the new processing source content are also presented. Accordingly, the relational contents can be continually presented without damaging the user's utility.

The Second Embodiment

Next, the content presentation apparatus of the second embodiment is explained. As to the same unit as the first embodiment, same sign is assigned, and its explanation is omitted.

Figure 10:
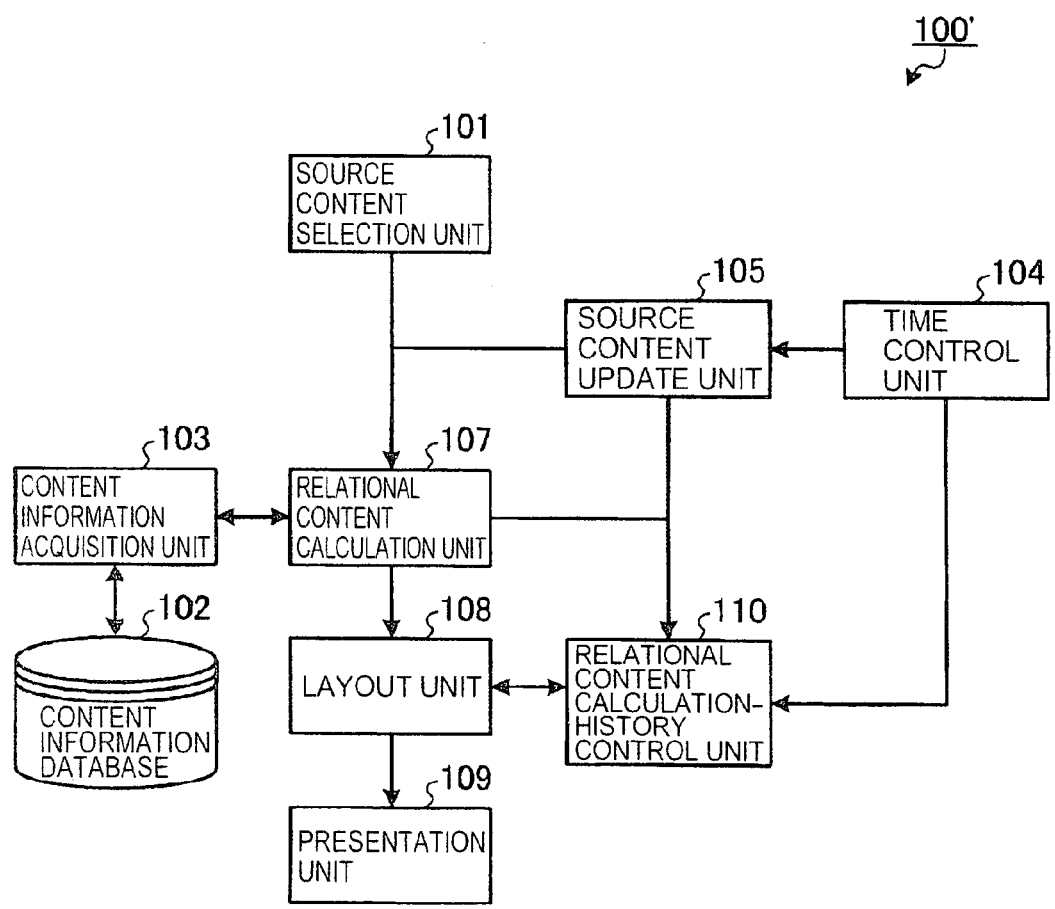
FIG. 10 is a block diagram of a content presentation apparatus 100' of the second embodiment.

(1) Component:

FIG. 10 is a block diagram of the content presentation apparatus 100'. The content presentation apparatus 100' includes the source content selection unit 101, the content information database 102, the content information acquisition unit 103, the time control unit 104, the source content update unit 105, the relational content calculation unit 107, the layout unit 108, the presentation unit 109, and a relational content calculation-history control unit 110. The relational content calculation-history control unit 110 is generated onto a storage unit (such as a RAM) in case of executing the program by CPU.

The relational content calculation unit 107 specifies a content related to the present processing source content selected by the source content selection unit 101 or updated by the source content update unit 105. Next, the relational content calculation unit 107 acquires metadata corresponding to each of specified contents (candidate contents), the present processing source content from the content information database 102 via the content information acquisition unit 103, and calculates the relevance between each of the candidate contents and the present processing source content, using the metadata. The relational content calculation unit 107 lists a plurality of contents (relational contents) in order of higher relevance from candidate contents. In the second embodiment, the relational content calculation unit 107 does not process the past processing source content (controlled by the source content history control unit 106). The relational content calculation unit 107 has the same component as that in the patent reference 2.

In the second embodiment, the relational content calculation unit 107 calculates the relevance R by following equation (5).

$$R = F(X, Y) \quad (5)$$

In the equation (5), "X" represents the processing source content, and "Y" represents a content as an object to calculate the relevance. As actual value of "X" and "Y", in the same way as the first embodiment, metadata corresponding to the content is used.

When the source content update unit 105 updates the processing source content, the relational content calculation-history control unit 110 sets the processing source content (before update) to the past processing source content (previous processing source content), and controls processing source history information of the update time and the past processing source content. Concretely, the relational content calculation-history control unit 110 stores the processing source history information. The processing source history information represents the update time, the past processing source content, the relational content (specified by the relational content calculation unit 107) of the past processing object and the relevance.

As to the relational content (present relational content) specified by the relational content calculation unit 107, the relational content (past relational content) represented by the processing source history information (controlled by the relational content calculation-history control unit 110) and the present processing source content, the layout unit 108 symbolically lays out them in a virtual space. In the same way as the first embodiment, the layout unit 108 visualizes the virtual space, and presents the visualized virtual space via the presentation unit 109.

Concretely, based on the relevance of the present relational content and the relevance of the past relational content (represented by the processing source history information), the layout unit 108 symbolizes the present processing source content, the present relational content and the past relational content respectively, and lays out each symbolized content in the virtual space. As a method for laying out the content, for example, the method used by the visualized content layout unit disclosed in the patent reference 1 is applied. Furthermore, in the second embodiment, in order to separately lay out the present relational content and the past relational content, the layout unit 108 divides a region of the virtual space.

A method for dividing the region is explained. In this example, the virtual space is two-dimensional space (xy-plane), the present processing source content is laid at the origin, and relational contents are laid around the origin based on the relevance. The region of the virtual space is divided by following equations (6) and (7).

$$S1: X^2 + y^2 \leq N \times G(\Delta t) \quad (6)$$

$$S2: S - S1 \quad (7)$$

In equations (6) and (7), S represents all region of the virtual space, S1 represents a region to lay out the present relational content, S2 represents a region to lay out the past relational content, N represents an arbitrary constant, and $G(\Delta t)$ represents a function of passing time $\Delta t$. For example, $G(\Delta t)$ is realized as a function shown in FIG. 4. However, $G(\Delta t)$ is not limited to the function in FIG. 4, and any function of passing time $\Delta t$ can be used as $G(\Delta t)$.

Figure 11:
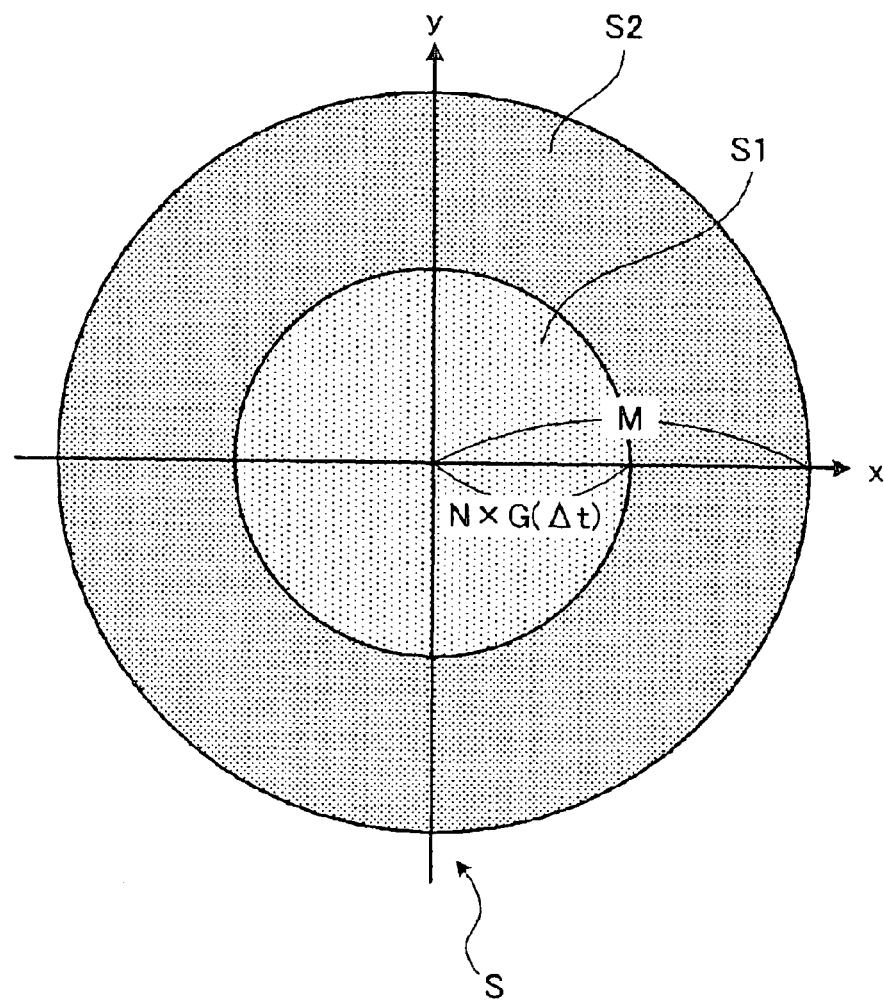
FIG. 11 is an example of regions S1 and S2.

FIG. 11 is an example showing regions S1 and S2. In FIG. 11, a circle having a radius "M(arbitrary positive number)" around the origin is a region S, a circle having a radius "N×G($\Delta t$)" in the region S is a region S1, and the region S excluding the region S1 is a region S2. In case that $G(\Delta t)$ is a function in FIG. 4, when a passing time is "0", the region S2 is the region S. In proportion to the passing time, the region S1 is gradually increasing from the origin while the region S2 is gradually decreasing. Last, the region S1 is the region S.

Based on a relevance of the present relational content (specified by the relational content calculation unit 107) and a relevance of the past relational content represented by the processing source history information (controlled by the relational content calculation-history control unit 110), the layout unit 108 symbolically lays out the present relational content in the region S1 and the past relational content in the region S2. A method for laying out the symbolized present relational content is same as that of the first embodiment. In the region S2, for example, by setting a layout start point as a point having a distance "N×G($\Delta t$)" from the origin, the symbolized past relational content is laid out.

In above explanation, as a method for dividing the region, an example that the region is increasing as a circle region is explained. However, the method is not limited to this example. For example, a fan-shaped region having an angle θ° from a positive direction of x-axis may be the region S1, and the region S excluding the region S1 may be S2. Furthermore, a shape of the divided region may not be a circle, or a continuous region. For example, the region S1 may be set by following equation (8).

$$S1: M \times G(\Delta t) \leq x^2 + y^2 N \times G(\Delta t) \quad (8)$$

In the equation (8), a region excluding the region S1 can be set as the region S2 (M<N). In this case, a doughnut-shaped region is S1, and two discontinuous regions (inner side region and outer side region of S1) are S2.

In above explanation, an example that the divided region is changing with passage of time is shown. However, this is only one example, and the divided region is not limited to this example. A factor to divide the region may not be passage of time. Irrespective of the passage of time, the region S may be divided into a plurality of fixed regions.

Furthermore, in above-explanation, an example that the region is represented in two-dimensional space is shown. However, this is only one example, and the region is not limited to this example. For example, the region may be represented in three-dimensional space After that, the layout unit 108 visualizes the virtual space in which each symbolized content is laid out, and presents the visualized virtual space via the presentation unit 109. This processing is same as the first embodiment.

(2) Operation:

Next, processing of the content presentation apparatus 100' of the second embodiment is explained. Steps of content presentation processing are same as steps in FIG. 6. Steps S1~S4 are same as those of the first embodiment. However, at S4, when the processing source content is updated, the relational content calculation-history unit 110 sets the processing source content (before update) to a past processing source content (a previous processing source content), and stores a processing source history information. The processing source history information represents the update time, a relational content of the past processing source content, and relevance between the relational content and the past processing source content. At S5, the relational content calculation unit 107 specifies the relational content. In this case, metadata of the present processing source content is acquired, candidate contents of the relational content are listed, and following processing is executed for each of the candidate contents. Metadata of each candidate content is acquired, and the relevance of each candidate content is calculated using metadata of the candidate content and metadata of the present processing source content, by the equation (4). From the candidate contents, the candidate content having the higher relevance is listed in order. The listed candidate content is specified as a present relational content of the present processing source content.

At S6, based on a relevance of the present relational content (specified at S5) and a relevance of the past relational content represented by the processing source history information (stored at S4), the layout unit 108 symbolically lays out the present relational content, the present relational content and the past relational content in the virtual space. As mentioned-above, the virtual space is divided into a plurality of regions. The symbolized present processing source content, the symbolized present relational content and the symbolized past relational content, are laid out in each region. After that, the virtual space in which the symbolized content is laid out in each region is visualized. Step S7 is the same as that of the first embodiment.

As mentioned-above, in the second embodiment, in case of calculating the relevance, the past processing source content is not taken into consideration. However, in case of laying out in the virtual space, the past processing source content is taken into consideration. Briefly, in addition to the relational content of the present processing source content, the relational content of the past processing source content is symbolically laid out. Accordingly, even if the processing source content changes with passage of time, relational contents to be laid out in the virtual space is changing continuously (not suddenly) before and after the change of the processing source content.

Furthermore, in the second embodiment, a region to lay out the present relational content is different from a region to lay out the past relational content. Accordingly, the present relational content and the past relational content are not presented in confusion. The user can correctly understand that the relational content relates to the present processing source content or the past processing source content.

The Third Embodiment

Next, the content presentation apparatus of the third embodiment is explained. As to the same unit as the first embodiment or the second embodiment, same sign is assigned, and its explanation is omitted.

Figure 12:
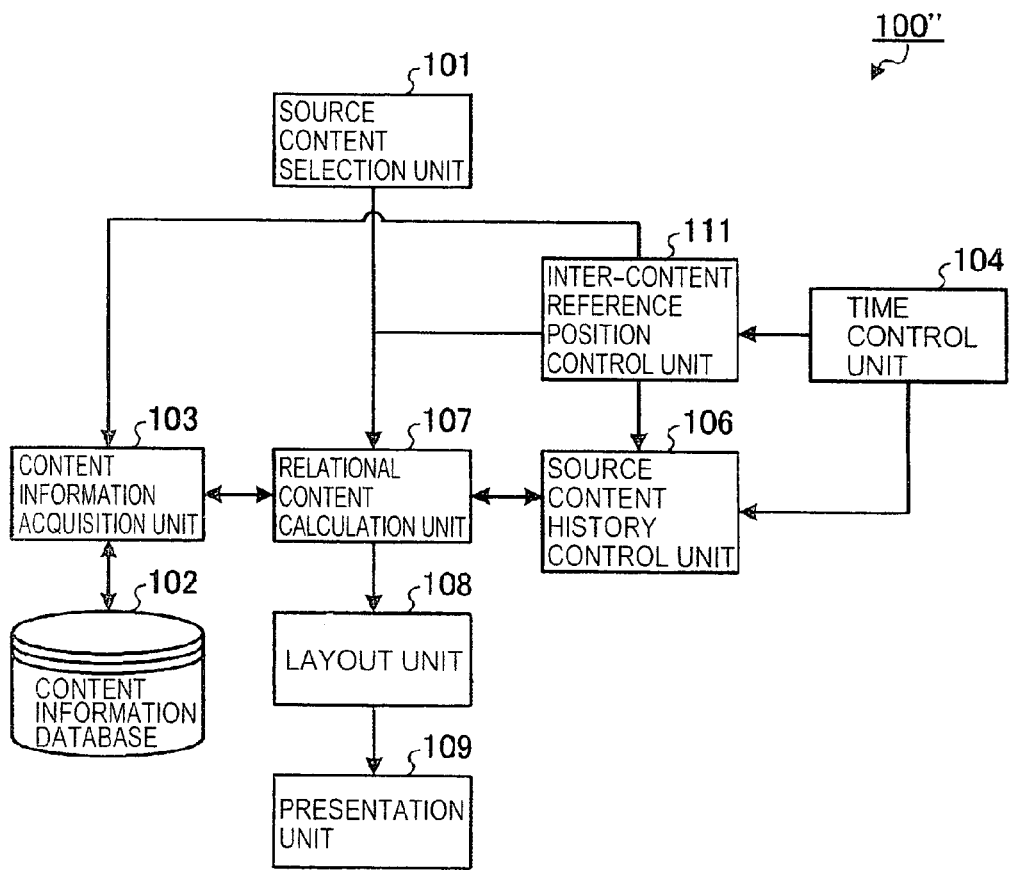
FIG. 12 is a block diagram of a content presentation apparatus 100" of the third embodiment.

(1) Component:

FIG. 12 is a block diagram of the content presentation apparatus 100". The content presentation apparatus 100" includes the source content selection unit 101, the content information database 102, the content information acquisition unit 103, the time control unit 104, the source content history control unit 106, the relational content calculation unit 107, the layout unit 108, the presentation unit 109, and an inter-content reference position control unit 111. The inter-content reference position control unit 111 is generated onto a storage unit (such as a RAM) in case of executing the program by CPU.

Based on time information generated from the time control unit 104, the inter-content reference position control unit 111 detects a reference position as a position of a part of the present processing source content (selected by the source content selection unit 101), and detects update of the reference position. This reference position can be detected using metadata. As explained in the content information acquisition unit 103 of the first embodiment, as to the content, metadata of all of the content and metadata of a part of the content are corresponded. For example, assume that the content presentation apparatus 100" is the recording equipment and the present processing source content is a TV program recorded. In the content presentation apparatus 100", while the present processing source content is played, a play position is gradually changing with passage of time. Based on change of the play position, metadata corresponding to the play position (or adjacency of the play position) are also changing. The inter-content reference position control unit 111 acquires the metadata via the content information acquisition unit 103, and detects change of the reference position when the metadata corresponding to the play position changes. Above-explanation is only one example, and a method for detecting change of the reference position is not limited to this example. For example, the reference position is not limited to one part of the content, and may be some range of the content. Furthermore, the inter-content reference position control unit 111 may simultaneously control a plurality of reference positions.

When the inter-content reference position control unit 111 detects change of the reference position in the processing source content, the source content history control unit 106 controls a reference position history information to represent metadata of the reference position (before update) as metadata of a past reference position. Concretely, when the inter-content reference position control unit 111 detects change of the reference position, the source content history control unit 106 acquires the detection time (update time) from the time control unit 104, and stores the reference position history information correspondingly representing the update time and metadata of the reference position (before update). The number of the reference position history information is not limited to one. The reference position history information of arbitrary units may be stored with update order of the reference position.

When the inter-content reference position control unit 111 detects change of the reference position, the relational content calculation unit 107 specifies a relational content of the present processing source content (selected by the object) and a relational content of the past reference position represented by the reference position history information (controlled by the source content history control unit 106). Concretely, as to the present processing source content and each of candidate contents (of relational content), the relational content calculation unit 107 acquires metadata of all of the content from the content information database 102 via the content information acquisition unit 103. Furthermore, the relational content calculation unit 107 acquires metadata corresponding to the past reference position in the present processing source content from the content information database 102. By using metadata of each content and metadata of the reference position, the relational content calculation unit 107 calculates a relevance between the present processing source content and each of the candidate contents, and calculates a relevance between the past reference position and each of the candidate contents. From the candidate contents, the relational content calculation unit 107 lists a candidate content in order of higher relevance. The candidate content listed is a relational content related to the present processing source content and the past reference position. A method for calculating the relevance is same as that of the first embodiment, for example, the equation (2) is used.

Figure 13:
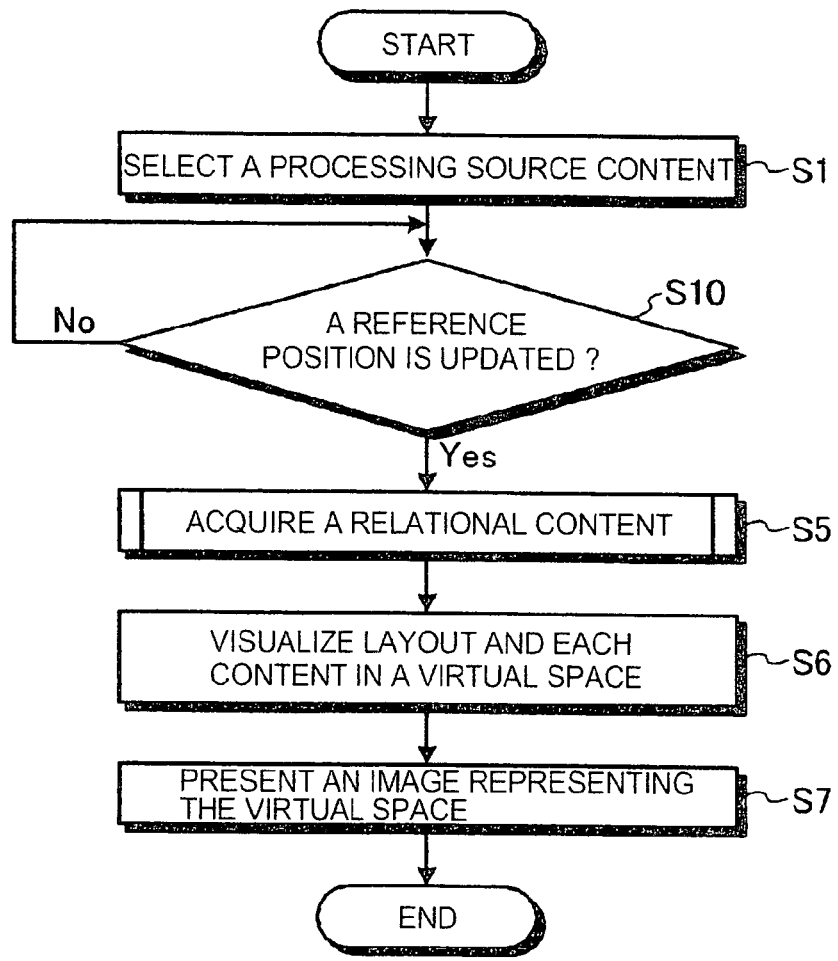
FIG. 13 is a flow chart of content presentation processing of the content presentation apparatus 100'''.

(2) Operation:

Next, processing of the content presentation apparatus 100" of the third embodiment is explained by referring to FIG. 13. S1 in FIG. 13 is same as S1 in FIG. 6. At S10, when change of the reference position is detected (Yes at S10), the inter-content reference position control unit 111 stores the reference position history information representing the update time and metadata of the reference position (before update) as the past reference position. At S5, the relational content calculation unit 107 specifies a relational content. In this case, as to the present processing source content (selected at S1) and each of candidate contents (of the relational content), the relational content calculation unit 107 acquires metadata of all of the content from the content information database 102. Furthermore, the relational content calculation unit 107 acquires metadata of the past reference position (represented by the reference position history information) from the content information database 102. By using metadata of each content and metadata of the reference position, the relational content calculation unit 107 calculates a relevance between the present processing source content and each of the candidate contents, and calculates a relevance between the past reference position and each of the candidate contents. From the candidate contents, the relational content calculation unit 107 lists a candidate content in order of higher relevance. Processing of S6-S7 is same as that of the first embodiment.

As mentioned-above, even if metadata corresponding to all of the processing source content does not change, when update of the reference position is detected based on change of metadata corresponding to a part of the processing source content, by calculating the relevance with each of candidate contents again, the relational content to be presented can be changed. For example, assume that a TV program (song program) is selected as the processing source content, a singer A appears at a time t1, and a singer B appears at a time t2. In a period when the singer A appears, metadata of the singer A is acquired. In a period when the singer B appears, metadata of the singer B is acquired. In this case, at the time t1, in addition to metadata of all of song program, metadata of the singer A is acquired. Accordingly, by calculating the relevance using both metadata, the relational content related to the song program and the singer A is presented. On the other hand, at the time t2, in addition to metadata of all of song program, metadata of the singer B is acquired. Accordingly, by calculating the relevance using both metadata, the relational content related to the song program and the singer B is presented.

As mentioned-above, in the third embodiment, even if the processing source content does not change on the whole, when a part of the processing source content changes with passage of time, a relational content can be dynamically presented based on change of the part. For example, while a relational content of a scene in a TV program (presently broadcasted) is presented, when the scene changes to another scene in the TV program (subject of the TV program largely changes), a relational content of another scene is presented, i.e., the relational content to be presented largely changes. As explained in the first embodiment, if a relational content to be presented based on change of the processing source content changes discontinuously, it often happens that the user suddenly misses the relational content to be searched. However, in the third embodiment, even if the subject of the TV program changes by changing a scene broadcasted, in addition to a relational content related to all the TV program, a relational content related to a scene (after changed) is presented. Briefly, the relational content more suitable for change of the scene in the processing source content (TV program) can be presented, and the relational content to be presented (before and after change of the part) does not change discontinuously.

The Fourth Embodiment

Next, the content presentation apparatus of the fourth embodiment is explained. As to the same unit as the first-third embodiments, same sign is assigned, and its explanation is omitted.

Figure 14:
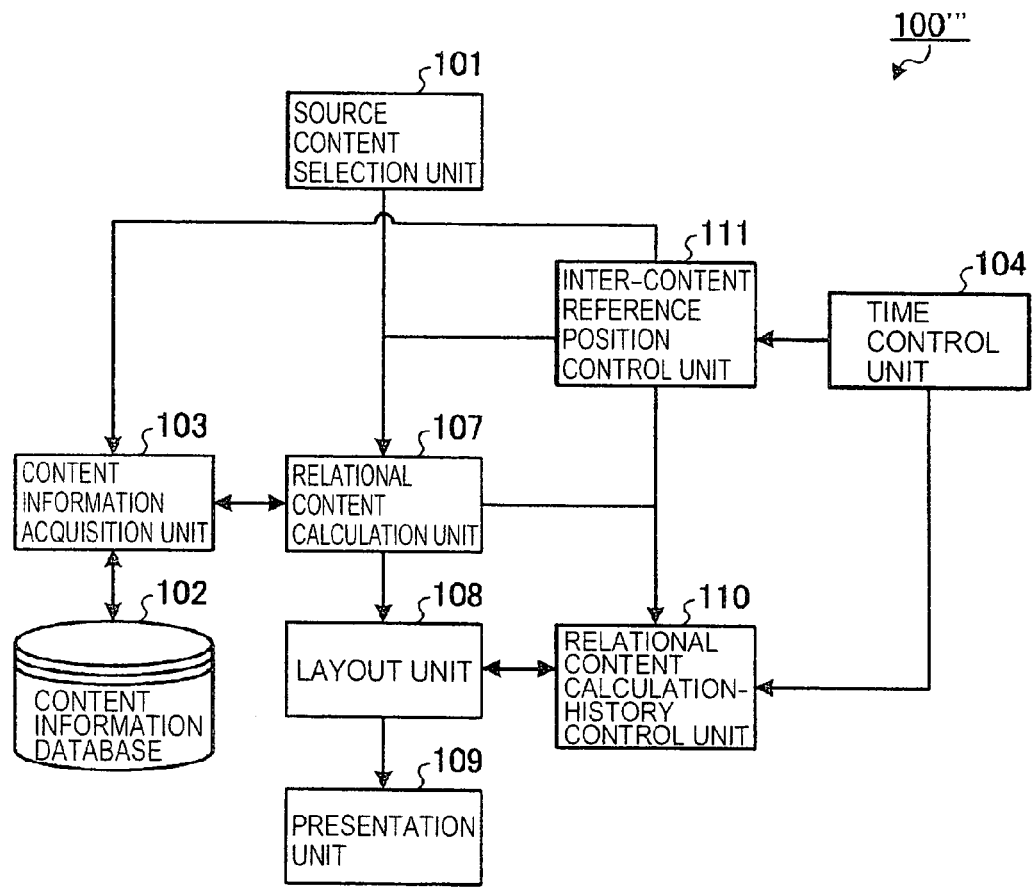
FIG. 14 is a block diagram of a content presentation apparatus 100'''' of the fourth embodiment.

(1) Component:

FIG. 14 is a block diagram of the content presentation apparatus 100'''. The content presentation apparatus 100''' has a component that the second embodiment is applied to the third embodiment. As shown in FIG. 14, the content presentation apparatus 100''' includes the source content selection unit 101, the content information database 102, the content information acquisition unit 103, the relational content calculation unit 107, the layout unit 108, the presentation unit 109, the relational content calculation-history control unit 110, and the inter-content reference position control unit 111.

The relational content calculation unit 107 specifies a relational content of the present processing source content (selected by the source content selection unit 101). Furthermore, when the inter-content reference position control unit 111 detects update of a reference position, the relational content calculation unit 107 specifies a relational content of the reference position. Concretely, the relational content calculation unit 107 acquires metadata used when update of the reference position is detected, and metadata corresponding to candidate contents (of the relational content) from the content information database 102 via the content information acquisition unit 103. By using the metadata, the relational content calculation unit 107 calculates a relevance between the reference position and each of the candidate contents, and lists a candidate content in order of higher relevance from the candidate contents. The candidate content listed is a reference content specified in relation to the reference position. In the same way as the second embodiment, calculation of the relevance is executed by the equation (5).

When the inter-content reference position control unit 111 detects update of a reference position, the relational content calculation-history control unit 110 sets the reference position (before update) to a past reference position (previous reference position), and controls processing source history information of the update time and the past reference position. Concretely, the relational content calculation-history control unit 110 stores the processing source history information. The processing source history information represents the update time, metadata of the past reference position, a relational content (specified by the relational content calculation unit 107) of the past reference position, and the relevance between the relational content and the past reference position.

Based on the relevance of the relational content (present relational content) specified by the relational content calculation unit 107, and the relevance of the relational content (past relational content) represented by the processing source history information (controlled by the relational content calculation-history control unit 110), the layout unit 108 symbolically lays out the present processing source content, the present relational content and the past relational content in a virtual space. Then the layout unit 108 visualizes the virtual space, and presents the visualized virtual space via the presentation unit 109. A method for laying out the visualized content in the virtual space is same as that of the second embodiment.

(2) Operation:

Next, processing of the content presentation apparatus 100''' of the fourth embodiment is explained. Steps of the content presentation processing are same as steps in FIG. 13. Steps S1 and S10 are same as S1 and S10 in the first embodiment. However, at S10, when the inter-content reference position control unit 111 change of the reference position is detected (Yes at S10), the relational content calculation-history control unit 110 stores the reference position history information representing the update time, metadata of the past reference position (before update), a relational content of the past reference position (specified at S5), and the relevance between the past reference position and the relational content. At S5, the relational content calculation unit 107 specifies a relational content of the present processing source content (selected at S1), and a relational content of the updated reference position (detected at S10). At S6, based on the relevance of the present relational content (of the present processing source content) specified at S5 and the relevance of the past relational content (of the past reference position) represented by the processing source history information stored at S10, the present processing source content (selected at S1), the present relational content and the past relational content are symbolically laid out in a virtual space, and the virtual space is visualized. Step S7 is same as that in the second embodiment.

As mentioned-above, in the fourth embodiment, even if the processing source content does not change on the whole, when a part of the processing source content changes with passage of time, a relational content is dynamically presented based on change of the part. In this case, the relational content related to all of the present processing source content, and the relational content related to the part of the processing source content, are separately presented in different regions. Under this component, even if the part of the processing source content changes with passage of time, the relational content to be symbolically laid in the virtual space (before and after change of the part) can change not suddenly but continuously. Furthermore, relational contents are not presented in confusion, and the user can correctly understand that the relational content relates to all of the present processing source content or the part of the present processing source content.

In above-mentioned embodiments, the content presentation apparatus 100 is the view equipment or the recording equipment of the TV program. However, the content presentation apparatus 100 is not limited to these equipments. For example, the content presentation apparatus 100 may be a computer comprising one apparatus such as a personal computer or a micro computer. Furthermore, the content presentation apparatus 100 may be realized by a system which a plurality of computers is connected via a network.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An apparatus for presenting content, comprising:
a selection unit configured to select first content as a processing object;
a timer configured to generate time information;
a detection unit configured to detect a change time when at least a part of the first content is changed to second content, based on the time information;
a calculation unit configured to calculate relevance between each of relational candidate contents, and each of the first content and the second content;
a content acquisition unit configured to acquire relational content from the relational candidate contents based on the relevance, the relational content being related to both the first content and the second content;
a layout unit configured to symbolically lay out the second content and the relational content in a virtual space; and
a presentation unit configured to visually present the virtual space,
wherein, as time passes from the change time, the calculation unit calculates the relevance so that a contribution ratio between relational candidate contents and the second content is larger while a contribution ratio between relational candidate contents and the first content is smaller.

2. The apparatus according to claim 1, further comprising:
an update unit configured to update the first content to the second content, when a change of all of the first content is detected; and
a first storage unit configured to store history information representing the first content, when the first content is updated to the second content.

3. The apparatus according to claim 2, further comprising:
a second storage unit configured to correspondingly store each content and metadata of the content;
wherein the calculation unit calculates the relevance using metadata of each of the relational candidate contents, the first content and the second content.

4. The apparatus according to claim 1, further comprising:
an update unit configured to update the first content to the second content, when a change of all of the first content is detected; and
a first storage unit configured to store history information representing the first content and the relational content, when the first content is updated to the second content.

5. The apparatus according to claim 4, wherein
the content acquisition unit acquires third content and fourth content from the relational candidate contents based on the relevance, the third content being related to at least a part of the first content, the fourth content being related to at least a part of the second content,
wherein the layout unit lays out the fourth content in a first region of the virtual space, and the third content in a second region different from the first region of the virtual space.

6. The apparatus according to claim 5, further comprising:
a second storage unit configured to correspondingly store each content and metadata of the content;
wherein the calculation unit calculates the relevance using metadata of each of the relational candidate contents and the second content.

7. The apparatus according to claim 1, further comprising:
an update unit configured to update a reference position as a position of the part of the first content to a next reference position as a position of a next part of the first content, when a change of the reference position is detected; and a first storage unit configured to store history information representing the reference position, when the reference position is updated to the next reference position, wherein the content acquisition unit acquires third content related to at least a part of the first content, and fifth content related to the reference position, and wherein the layout unit symbolically lays out the first content, the third content and the fifth content in the virtual space.

8. The apparatus according to claim 7, wherein
the calculation unit calculates relevance between each of relational candidate contents, and each of the first content and the reference position, and wherein the content acquisition unit acquires at least one of the third content and the fifth content from the relational candidate contents based on the relevance.

9. The apparatus according to claim 8, further comprising:
a second storage unit configured to correspondingly store each content, first metadata of all of the content, and second metadata of a part of the content;

wherein the detection unit detects the change of the reference position by referring to the second metadata of the first content, wherein the first storage unit stores the second metadata of the reference position of the first content, and wherein the calculation unit calculates the relevance using the first metadata of the first content, the first metadata of each of the relational candidate contents, and the second metadata of the reference position of the first content.

10. The apparatus according to claim 1, further comprising:
an update unit configured to update a reference position as a position of the part of the first content to a next reference position as a position of a next part of the first content, when a change of the reference position is detected; and a first storage unit configured to store history information representing the reference position and fifth content related to the reference position, when the reference position is updated to the next reference position, wherein the content acquisition unit acquires at least one of third content related to at least a part of the first content, and sixth content related to the next reference position; and wherein the layout unit symbolically lays out the at least one, the first content and the fifth content in the virtual space.

11. The apparatus according to claim 10, wherein
the calculation unit calculates relevance between each of relational candidate contents, and each of the first content and the next reference position, wherein the content acquisition unit acquires the at least one from the relational candidate contents based on the relevance, and wherein the layout unit symbolically lays out the at least one in a first region of the virtual space, and the fifth content in a second region different from the first region of the virtual space.

12. The apparatus according to claim 11, further comprising:
a second storage unit configured to correspondingly store each content, first metadata of all of the content, and second metadata of a part of the content;

wherein the detection unit detects the change of the reference position by referring to the second metadata of the first content, wherein the first storage unit stores the second metadata of the reference position of the first content, and wherein the calculation unit calculates the relevance using the first metadata of the first content, the first metadata of each of the relational candidate contents, and the second metadata of the next reference position of the first content.

13. The apparatus according to claim 1, wherein
the part includes metadata of the first content.

14. The apparatus according to claim 1, wherein
the calculation unit calculates the relevance by weighted sum of a first relevance between a relational candidate content and the first content, and a second relevance between the relational candidate content and the second content, and as time passes from the change time, a weight of the second relevance is larger while a weight of the first relevance is smaller.

15. The apparatus according to claim 1, wherein
the content acquisition unit acquires the relational content related to both the first content and the second content until the passing time is equal to a predetermined time, and acquires the relational content related to only the second content when the passing time is equal to or greater than the predetermined time.

16. A method for presenting content, comprising:
selecting first content as a processing object;
generating time information from a timer;
detecting a change time when at least a part of the first content is changed to second content based on the time information;
calculating relevance between each of relational candidate contents, and each of the first content and the second content;
acquiring relational content from the relational candidate contents based on the relevance, the relational content being related to both the first content and the second content;
symbolically laying out the second content and the relational content in a virtual space; and
visually presenting the virtual space via a display,
wherein the calculating comprises, as time passes from the change time, calculating the relevance so that a contribution ratio between relational candidate contents and the second content is larger while a contribution ratio between relational candidate contents and the first content is smaller.

17. A non-transitory computer-readable medium storing a program which, when executed by a processing system, causes the processing system to perform operations comprising:
detecting a change time when at least a part of first content is changed to second content, based on time information from a timer;
calculating relevance between each of relational candidate contents, and each of the first and the second content;
acquiring relational content from the relational candidate contents based on the relevance, the relational content being related to both the first content and the second content; and
symbolically laying out the second content and the relational content in a virtual space at the same time,
wherein the calculating comprises, as time passes from the change time, calculating relevance so that a contribution ratio between relational candidate contents and the second content is larger while a contribution ratio between relational candidate contents and the first content is smaller.

* * * * *